(12) United States Patent
Katar et al.

(10) Patent No.: US 9,992,723 B2
(45) Date of Patent: Jun. 5, 2018

(54) TECHNIQUES FOR HANDLING DATA STALL IN WLAN

(71) Applicant: QUALCOMM Incorporated, San Diego, CA (US)

(72) Inventors: Srinivas Katar, Fremont, CA (US); Arnaud Meylan, San Diego, CA (US); Farrukh Usmani, Carlsbad, CA (US); Srikant Kuppa, Fremont, CA (US); Subramania Sharma Thandaveswaran, Milpitas, CA (US); Ramaswamy Venkateshwaran, Fremont, CA (US); Hoonki Lee, San Jose, CA (US); Viral Modi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 15/047,385

(22) Filed: Feb. 18, 2016

(65) Prior Publication Data

US 2017/0245190 A1  Aug. 24, 2017

(51) Int. Cl.
*H04W 36/30* (2009.01)
*H04W 84/12* (2009.01)
*H04W 36/36* (2009.01)

(52) U.S. Cl.
CPC .......... *H04W 36/30* (2013.01); *H04W 36/36* (2013.01); *H04W 84/12* (2013.01)

(58) Field of Classification Search
CPC ..... H04W 36/30; H04W 36/36; H04W 84/12; H04W 36/00; H04W 36/22; H04W 88/06; H04W 88/10

(Continued)

(56) References Cited

U.S. PATENT DOCUMENTS 7,924,785 B2   4/2011  Shaheen et al.
8,830,858 B2 * 9/2014  Macias ................. H04W 48/18
                                              370/252

(Continued)

FOREIGN PATENT DOCUMENTS

WO    WO-2012/145706 A1   10/2012

OTHER PUBLICATIONS

Guo C., et al., "Integration of Wireless LAN and 3G Wireless—Efficient Mobility Management for Vertical Handoff between wwan and wlan", IEEE Communications Magazine, IEEE Service Center, Piscataway, US, vol. 41, No. 11, Nov. 1, 2003 (Nov. 1, 2003), XP011103281, pp. 102-108.

(Continued)

*Primary Examiner* — Afsar M Qureshi
(74) *Attorney, Agent, or Firm* — Arent Fox, LLP

(57) ABSTRACT

Aspects of the present disclosure describe various techniques for handling data stall in wireless local area networks (WLANs). These techniques include, for example, a method in which wireless communications are switched at a wireless station from a first network device associated with a first radio access technology (RAT) (e.g., WLAN technology) to a second network device associated with a second RAT (e.g., wireless wide area network (WWAN) technology). The wireless station may then monitor network devices associated with the first RAT, including the first network device. The wireless station may filter results from the monitoring based at least in part on one or more threshold value and identify, based on the filtered results, one of the network devices as suitable for the wireless communications. The wireless communications may then be switched at the wireless station from the second network device to the one network device identified as suitable for the wireless communications.

28 Claims, 8 Drawing Sheets

(58) Field of Classification Search
USPC .................................................. 370/331, 332
See application file for complete search history.

(56) References Cited

U.S. PATENT DOCUMENTS

| | | | |
|---|---|---|---|
| 9,445,334 B2* | 9/2016 | Tinnakornsrisuphap | ................... H04W 36/22 |
| 2005/0059400 A1 | 3/2005 | Jagadeesan et al. | |
| 2005/0090259 A1 | 4/2005 | Jain et al. | |
| 2013/0077482 A1 | 3/2013 | Krishna et al. | |
| 2014/0247731 A1* | 9/2014 | Nagaraj | ............... H04W 36/30 370/252 |
| 2015/0031367 A1 | 1/2015 | Singh et al. | |
| 2015/0063145 A1* | 3/2015 | Jactat | ................... H04W 24/02 370/252 |
| 2015/0327129 A1* | 11/2015 | Faccin | .............. H04W 36/0055 370/331 |
| 2017/0134123 A1* | 5/2017 | Ozturk | .................. H04L 1/1628 |

OTHER PUBLICATIONS

International Search Report and Written Opinion—PCT/US2017/013752—ISA/EPO—dated Apr. 11, 2017. (18 total pages).
Z. Dai et al., "Vertical handover criteria and algorithm in IEEE 802.11 and 802.16 hybrid networks," pp. 1-5.
Stefano Busanelli et al., "Vertical Handover between WiFi and UMTS Networks: Experimental Performance Analysis," International Journal of Energy. Information and Communications, Feb. 2011, vol. 2, Issue 1, pp. 75-96.

* cited by examiner

TECHNIQUES FOR HANDLING DATA STALL IN WLAN

BACKGROUND

Aspects of this disclosure relate generally to telecommunications, and more particularly to techniques for handling data stall in wireless local area networks (WLANs).

The deployment of WLANs in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). Nearby BSSs may have overlapping coverage areas and such BSSs may be referred to as overlapping BSSs or OBSSs.

Wireless stations, also referred to as wireless or mobile devices, may use more than one modem to allow seamless connectivity for certain applications. In one scenario, a wireless station may include a WLAN modem (e.g., Wi-Fi modem) and a wireless wide area network (WWAN) modem (e.g., cellular modem) to enable such seamless connectivity. The wireless stations may then select between a WLAN and a WWAN for wireless communications based on the availability of the network, the data rates that can be achieved, and user preference. For example, a user may typically prefer to connect to a Wi-Fi network over a cellular network because cellular data usage is more costly. As such, the wireless station may be configured to select network connectivity over a Wi-Fi network instead of network connectivity over a cellular network when a Wi-Fi network is available. However, Wi-Fi networks have a shorter range than cellular networks and at the edge of the Wi-Fi network the data rates can be low whereas packet error rate (PER) can be high. In such cases, selecting a Wi-Fi network (e.g., Wi-Fi network connectivity) instead of a cellular network (e.g., cellular network connectivity) can result in poor user experience. Because of the preference for Wi-Fi networks, it is likely that the wireless station will remain connected to the Wi-Fi network and any current applications (e.g., video) cannot be properly run because of limited to no data exchanges, resulting in what is referred to as a "data stall." The user may then have to manually disconnect from the Wi-Fi network to get out of the data stall condition.

Accordingly, it may be desirable to have techniques that handle data stall conditions to provide a better experience for the user.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides for a method for handling data stall at a wireless station that includes switching wireless communications from a first network device (e.g., Wi-Fi access point) associated with a first radio access technology (RAT) (e.g., Wi-Fi technology) to a second network device (e.g., base station) associated with a second RAT (e.g., cellular technology). The method further includes monitoring one or more network devices (e.g., Wi-Fi access points) associated with the first RAT, where the one or more network devices include the first network device, and filtering results from the monitoring based at least in part on one or more threshold values. In addition, the method includes identifying, based on the filtered results, one of the one or more network devices as suitable for the wireless communications and switching the wireless communications from the second network device to the one network device identified as suitable for the wireless communications. A framework operating on the wireless station may be configured to perform the switching and one or more of the monitoring, filtering, or identifying operations associated with the method.

In accordance with another aspect, the present disclosure provides for an apparatus (e.g., an STA) for handling data stall that includes a memory configured to store instructions and one or more processors communicatively coupled to the memory. The one or more processors are configured to execute the instructions to switch wireless communications from a first network device associated with a first RAT to a second network device associated with a second RAT, to monitor one or more network devices associated with the first RAT, where the one or more network devices include the first network device, to filter results from the monitoring based at least in part on one or more threshold values, to identify, based on the filtered results, one of the one or more network devices as suitable for the wireless communications, and to switch the wireless communications from the second network device to the one network device identified as suitable for the wireless communications. A framework operating on the apparatus may be configured to perform the switching and one or more of the monitoring, filtering, or identifying operations associated with the apparatus.

In accordance with another aspect, the present disclosure provides for an apparatus (e.g., an STA) for handling data stall that includes means for switching wireless communications from a first network device associated with a first RAT to a second network device associated with a second RAT. The apparatus further includes means for monitoring one or more network devices associated with the first RAT, where the one or more network devices include the first network device, and means for filtering results from the monitoring based at least in part on one or more threshold values. In addition, the apparatus includes means for identifying, based on the filtered results, one of the one or more network devices as suitable for the wireless communications. The means for switching may be further for switching the wireless communications from the second network device to the one network device identified as suitable for the wireless communications. A framework operating on the apparatus may be configured to perform the switching and one or more of the monitoring, filtering, or identifying operations associated with the apparatus.

In accordance with yet another aspect, the present disclosure provides for a computer-readable medium (e.g., a non-transitory medium) storing code executable by a computer for handling data stall at a wireless station that includes code for switching wireless communications from a first network device associated with a first RAT to a second network device associated with a second RAT. The computer-readable medium may further include code for monitoring one or more network devices associated with the first RAT, where the one or more network devices include the first network device, and code for filtering results from the monitoring based at least in part on one or more threshold values. In addition, the computer-readable medium may include code for identifying, based on the filtered results, one of the one or more network devices as suitable for the wireless communications, and code for switching the wireless communications from the second network device to the one network device identified as suitable for the wireless communications. A framework operating on the wireless station may be configured to perform the switching and one or more of the monitoring, filtering, or identifying operations associated with the wireless station.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
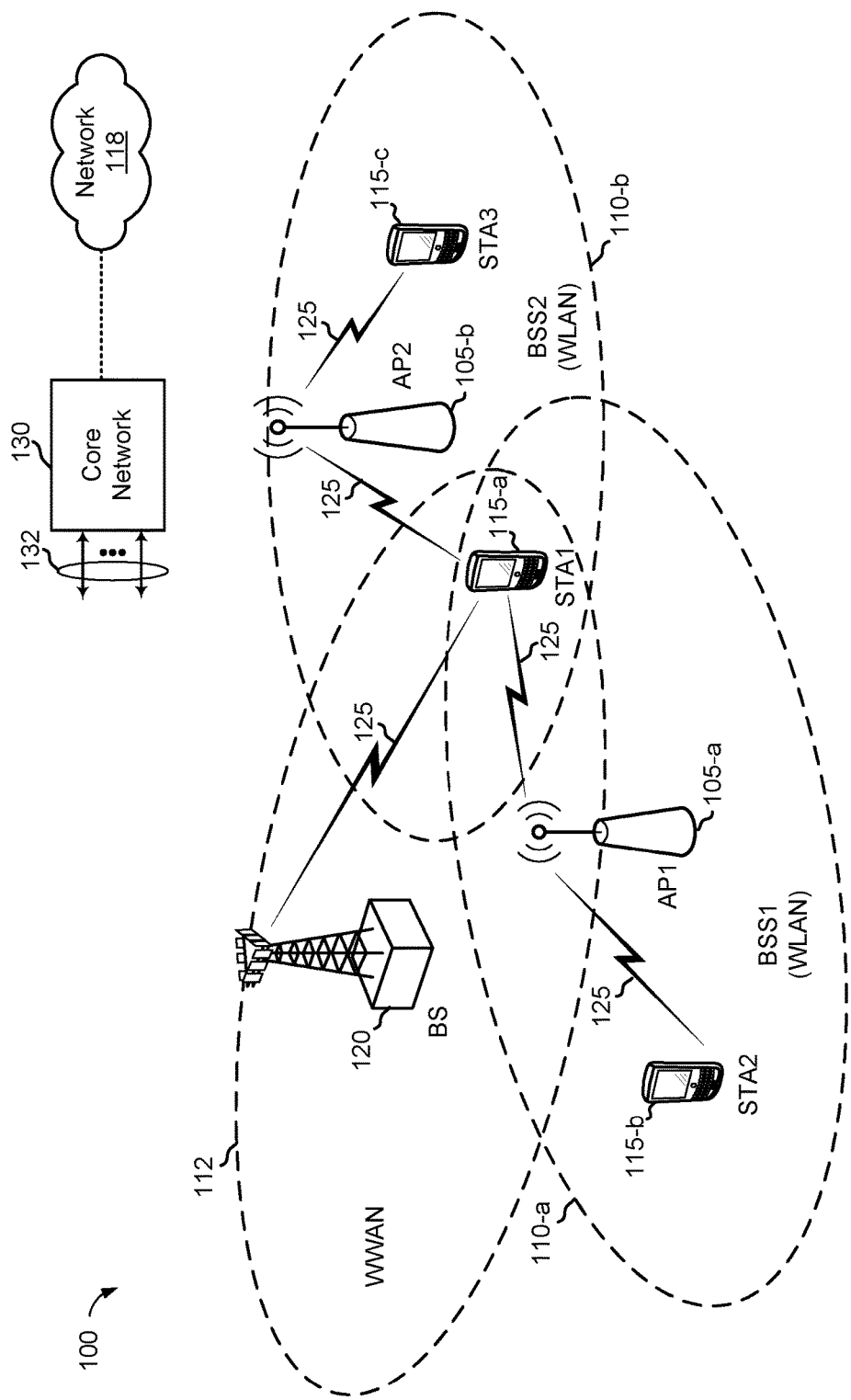
FIG. 1 is a conceptual diagram illustrating an example of a wireless local area network (WLAN) deployment and a wireless wide area network (WWAN) deployment in connection with techniques for handling data stall conditions.

The detailed description set forth below in connection with the appended drawings is intended as a description of various configurations or implementations, and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure relates to techniques for handling data stall and similar conditions in WLANs (e.g., in Wi-Fi networks). Currently, to enable seamless wireless connectivity, some wireless stations are configured to connect to network devices of multiple types (e.g., network devices that support different radio access technologies or RATs). For example, a wireless station may be able to connect to a first network device associated with a first RAT (e.g., an access point in a Wi-Fi network) and to a second network device associated with a second RAT (e.g., a base station in a cellular network). Seamless wireless connectivity may refer to the wireless station's ability to use different RATs to maintain a certain quality-of-service (QoS) and/or another metric that allows for a certain level of user experience to be met. For example, some wireless stations can determine whether to connect to either a Wi-Fi network device (e.g., a Wi-Fi access point) or a cellular network device (e.g., a cellular base station) based on availability of Wi-Fi or cellular service at a particular location and time, data rates associated with Wi-Fi or cellular service, or user settings in order to provide the needed connectivity for certain applications. The operating systems available in wireless stations are often configured to prioritize or select an available Wi-Fi access point that can be authenticated over cellular base stations because Wi-Fi services are significantly less expensive (and mostly free) relative to cellular services (e.g., cellular network data communications). However, when a wireless station moves away from its associated Wi-Fi access point to, for example, the edge of the Wi-Fi access point's coverage area, the wireless station may exhibit degraded communication properties because of a weak link (e.g., a link having poor quality metrics), which may result in poor user experience. In some cases (e.g., in a home network), there may not be other Wi-Fi access points nearby to enable the wireless station to roam in order to get better performance. The wireless station may typically remain connected to the Wi-Fi access point with very limited to no data exchanges, that is, the wireless station does not roam to a cellular network. This scenario or condition is typically referred to as a "data stall" or "Wi-Fi data stall", and can cause very poor user experience, particularly for those applications that involve regular and/or large exchanges of data.

The present disclosure describes various techniques that can be used to address data stall and similar conditions by causing an early switch from a WLAN (e.g., a Wi-Fi network) to a wireless wide area network (WWAN) (e.g., a cellular network) based at least in part on monitoring uplink (UL) and downlink (DL) quality metrics, as well as network congestion metrics. In Wi-Fi networks, network congestion may refer to the subset or fraction of airtime during which a wireless station is granted use of the Wi-Fi medium relative to other wireless stations that are also connected to the same Wi-Fi access point. In an aspect, a wireless station may intentionally disconnect from the Wi-Fi access point, even when the Wi-Fi access point can be detected, to enable a framework operating or executing on the wireless station to switch to a cellular base station any existing wireless communications associated with one or more user-level applications operating on the wireless station. User-level applications, also referred to as end-user programs, may include applications that involve user participation such as browsers, word processors, databases, and multimedia applications, for example. Existing wireless communications may refer, for example, to the exchange of data and/or control information between a running user-level application and a remote device (e.g., server) at least partially through a wireless connection or channel. In another aspect, the wireless station may remain connected to the Wi-Fi access point even after switching the wireless communications to the cellular base station. By switching network connectivity from a Wi-Fi access point to cellular base station, a desirable level of user experience may be maintained and the data stall conditions may be avoided or overcome.

The present disclosure also describes various techniques for switching back from the WWAN (e.g., cellular network) to the WLAN network (e.g., Wi-Fi network) when the appropriate conditions are met to avoid or minimize the higher costs associated with WWAN services. For example, it may be desirable to switch wireless communications from a cellular base station back to a Wi-Fi access point, which could be the same or a different Wi-Fi access point from before (e.g., when the early switch occurred), once a Wi-Fi connection with the appropriate link quality metrics is identified. One reason for switching back to Wi-Fi network connectivity from cellular network connectivity is to minimize or reduce the use of higher operational costs associated with cellular network connectivity (e.g., higher cost of data plans in cellular services).

Several aspects of wireless communications systems in which techniques for handling data stall conditions are used will now be presented with reference to various apparatuses, methods, and computer-readable medium. These apparatuses, methods, and computer-readable medium will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software may depend upon the particular application and design constraints imposed on the overall system. In an aspect, any of these elements may refer to one of the parts that make up a system and may be divided into other elements.

Figure 4:
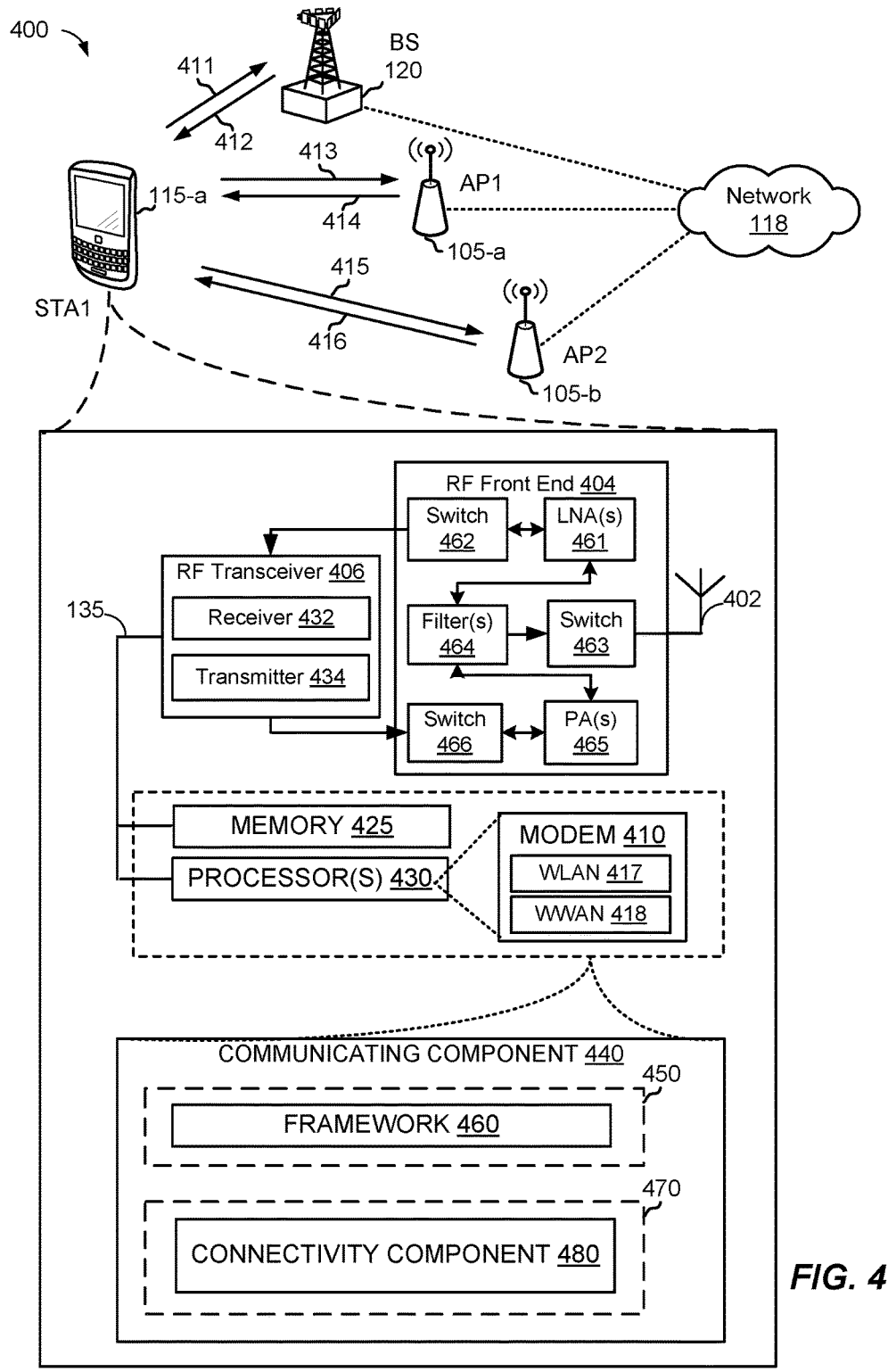
FIG. 4 is a schematic diagram illustrating features of a wireless station for handling data stall conditions in accordance with various aspects of the present disclosure.

By way of example, an element, or any portion of an element, or any combination of elements may be implemented with a "processing system" that includes one or more processors (see e.g., FIG. 4). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium (e.g., a non-transitory medium). Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Accordingly, in some aspects, the methods, apparatuses, and computer-readable medium described in the present disclosure may provide an efficient solution, as compared to current solutions, for handling data stall or similar conditions in order to maintain an appropriate level of user experience (e.g., seamless wireless connectivity) while minimizing or reducing the cost of the services that enable such user experience.

Referring to FIG. 1, there is shown a wireless communications system 100 illustrating an example of a WLAN deployment (e.g., Wi-Fi network deployment) in connection with various techniques described herein. The WLAN deployment may include one or more access points (APs) and one or more wireless stations (STAs) associated with a respective AP. As noted above, the wireless stations may also be referred to as wireless or mobile devices. Also illustrated in FIG. 1 is at least a portion of a WWAN deployment (e.g., cellular network deployment) that may include one or more base stations (BSs, eNodeBs, or eNBs). Wireless communications system 100 may therefore support multiple radio access technologies (RATs), where WLAN technology may be a first supported RAT and WWAN technology may be a second supported RAT. Accordingly, one or more of the wireless stations shown in FIG. 1 may be hybrid devices that can perform wireless communications with the WLAN deployment via WLAN network devices (e.g., Wi-Fi access points), with the WWAN deployment via WWAN network devices (e.g., cellular base stations), or with both deployments.

In the example of FIG. 1, there are only two APs 105 in the WLAN deployment for illustrative purposes: AP1 105-*a* in basic service set 1 (BSS1) and AP2 105-*b* in BSS2. AP1 105-*a* is shown having at least two associated STAs 115 (STA1 115-*a* and STA2 115-*b*) and coverage area 110-*a*, whereas AP2 105-*b* is shown having at least two associated STAs 115 (STA1 115-*a* and STA3 115-*c*) and coverage area 110-*b*. The coverage area of AP1 105-*a* overlaps part of the coverage area of AP2 105-*b* such that STA1 115-*a* is within the overlapping portion of both coverage areas. The number of BSSs, APs, and STAs, and the coverage areas of the APs described in connection with the WLAN deployment of FIG. 1 are provided by way of illustration and not of limitation. Moreover, aspects of the various techniques described herein are at least partially based on the example WLAN deployment of FIG. 1 but need not be so limited.

The APs 105 (e.g., AP1 105-*a* and AP2 105-*b*) shown in FIG. 1 are generally fixed terminals that provide backhaul services to STAs within its coverage area or region. In some applications, however, one or more of the APs 105 may be a mobile or non-fixed terminal. The STAs 115 (e.g., STA1 115-*a*, STA2 115-*b* and STA3 115-*c*) shown in FIG. 1, which may be fixed, non-fixed, or mobile terminals, utilize the backhaul services of their respective AP to connect to a network (e.g., network 118), such as the Internet. Examples of an STA 115 include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA 115 may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP 105 may also be referred to as: a base station, a base transceiver station, a radio base station, a radio transceiver, a transceiver function, a small cell, or any other suitable terminology. The various concepts described throughout this disclosure are intended to apply to all suitable wireless apparatus regardless of their specific nomenclature.

Each of STA1 115-a, STA2 115-b, and STA3 115-c may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs 115 to connect to a network via communications links 125. The APs 105 can send frames, packets, data units, or similarly structured communications to their respective STAs 115, and receive frames, packets, data units, or similarly structured communications from their respective STAs 115, to communicate data and/or control information (e.g., signaling).

Each of AP1 105-a and AP2 105-b can establish a communications link 125 with an STA 115 that is within the coverage area of the AP 105 to perform wireless communications with the STA 115. Communications links 125 can comprise communications channels that can enable both uplink and downlink communications. An established exchange using a communications link 125 may be referred to as a wireless connection or simply a connection. When connecting to an AP 105, an STA 115 can first authenticate itself with the AP 105 and then associate itself with the AP 105. Once associated, a communications link 125 can be established between the AP 105 and the STA 115 such that the AP 105 and the associated STA 115 can exchange frames, messages, packets, or the like through a direct communications channel.

In the example of FIG. 1, there is a base station (BS) 120 in the WWAN deployment (e.g., cellular network deployment) for illustrative purposes. BS 120 may be referred to as a NodeB, eNodeB, Home NodeB, a Home eNodeB, or some other suitable terminology. Aspects of the various techniques described herein are at least partially based on the example WWAN deployment of FIG. 1 but need not be so limited.

The coverage area 112 of BS 120 may be divided into sectors making up only a portion of the coverage area (not shown). The coverage area 112 may typically be larger than the coverage areas 110-a and 110-b associated with AP1 105-a and AP2 105-b, respectively. In some cases, AP1 105-a and AP2 105-b may be referred to as small cells and BS 120 may be referred to as a macro cell based at least in part on their respective coverage areas. Moreover, the coverage area of BS 120 overlaps part of the coverage areas of AP1 105-a and AP2 105-b such that STA1 115-a is within the overlapping portion of the coverage areas. When STA1 115-a is a hybrid device, it may be configured to perform wireless communications with one or more of BS 120, AP1 105-a, or AP2 105-b. As noted above, wireless communications may involve particular or specific communications associated with the operations of a user-level application or end-user program in STA1 115-a. As described in more detail below, to maintain seamless connectivity, handle data stall conditions, and minimize operational costs to the user, the wireless communications associated with a user-level application or end-user program may be switched between Wi-Fi network connectivity (e.g., connectivity via AP1 105-a or AP2 105-b) and cellular network connectivity (e.g., connectivity via BS 120).

As described herein, STA1 115-a may be configured to switch between Wi-Fi network connectivity and cellular network connectivity in connection with handling data stall and similar conditions. For example, STA1 115-a may perform an early switch from communicating with one of AP1 105-a or AP2 105-b to communicating with BS 120 and/or subsequently perform an intelligent switch from communicating with BS 120 to communication with one of AP1 105-a or AP2 105-b. When switching from providing network connectivity using one RAT to providing network connectivity using another RAT, STA1 115-a may use different modems. For example, switching the wireless communications may involve switching communications between a first modem (e.g., a Wi-Fi modem or Wi-Fi portion of a modem) and a second modem (e.g., a cellular modem or cellular portion of a modem).

STA1 115-a may be configured to communicate with the BS 120 using communications links 125. Communications links 125 between STA1 115-a and AP1 105-a or AP2 105-b may utilize protocols associated with a first RAT (e.g., Wi-Fi technology), whereas communications links 125 between STA1 115-a and BS 120 may utilize protocols associated with a second RAT (e.g., cellular technology such as long term evolution (LTE)). That is, the physical link(s) associated with communications links 125 between STA1 115-a and AP1 105-a or AP2 105-b may have different characteristics, properties, and structure than the physical link(s) associated with communications links 125 between STA1 115-a and BS 120.

Core network 130, and correspondingly network 118, may communicate with BS 120 or with the APs 105 via one or more backhaul links 132 (e.g., S1 interface, etc.). BS 120 and/or APs 105 may also communicate with one another, e.g., directly or indirectly via backhaul links (not shown) (e.g., X2 interface, etc.) and/or via backhaul links 132 (e.g., through core network 130).

Wireless communications system 100 may support synchronous or asynchronous operation with BS 120 and/or APs 105. Moreover, wireless communications system 100 may operate according to frequency division duplexing (FDD) or time division duplexing (TDD). For the WWAN deployment, when an LTE network is being used, orthogonal frequency-division multiple access (OFDMA) communications signals may be used in communications links 125 between BS 120 and STA1 115-a for LTE downlink transmissions for each hierarchical layer, whereas single carrier frequency division multiple access (SC-FDMA) communications signals may be used in communications links 125 between BS 120 and STA1 115-a for LTE uplink transmissions.

In an aspect, one or more STAs 115 in wireless communications system 100 may be configured to handle data stall or similar conditions. For example, a wireless station, such as STA1 115-a shown in FIG. 1, may be configured to handle data stall conditions by performing an early switch from a Wi-Fi access point (e.g., WLAN network device), such as AP1 105-a, to a cellular base station (e.g., WWAN network device), such as BS 120. By switching early, STA1 115-a may avoid or overcome the low data rates and/or high PER conditions that may be associated with the data stall. For example, STA1 115-a may be configured to determine, from information available at Wi-Fi drivers/firmware in the STA1 115-a, to switch existing wireless communications from AP1 105-a to BS 120 to overcome a weak link with AP1 105-a. In an aspect, STA1 115-a may automatically disconnect from AP1 105-a when the weak link is detected, which may enable a framework (see e.g., framework 460 in FIGS. 5A and 5B, and framework 610 in FIG. 6) operating on STA1 115-a to switch existing wireless communications to BS 120.

A framework may refer to an entity operating on STA1 115-a that is configured to monitor Wi-Fi network connectivity and determine whether to use Wi-Fi or cellular network connectivity for wireless communications. An entity as described herein may refer to an element of a program, software, or firmware that is structurally and functionally distinct from other elements and that is separately referenced. An entity may be configured as part of a particular layer, where a layer may refer to one of multiple functional elements that interact in some sequential and hierarchical way, and where each layer usually has a specified interface to communicate with an adjacent layer in the sequence or hierarchy. In an aspect, an entity, or a layer associated with the entity, may be implemented in hardware separate from hardware associated with other related entities, or other related layers. As such, each entity or layer may be implemented as a separate hardware component or a separate means for performing the functions associated with the entity or layer.

Moreover, STA1 115-a may be configured to switch the wireless communications back to a Wi-Fi access point (e.g., WLAN network device) from the cellular base station (e.g., WWAN network device), such as BS 120, in response to detecting or determining that the link quality of the Wi-Fi network (e.g., link to AP1 105-a or AP2 105-b) has improved or satisfies certain metrics. For example, STA1 115-a may be configured to continuously monitor, after switching the wireless communications to BS 120, Wi-Fi link characteristics and Wi-Fi driver/firmware information. In an aspect, STA1 115-a may disassociate (e.g., disconnect) from AP1 105-a (and connect to BS 120) until the link quality of either AP1 105-a or AP2 105-b is appropriate to handle the wireless communications. This approach may avoid having STA1 115-a perform a scan and prematurely rejoin AP1 105-a when the link quality with AP1 105-a has not improved to the point that is suitable for the wireless communications. The switching of the wireless communications back to a Wi-Fi access point may be determined, at least in part, by the framework operating on STA1 115-a.

In an example of the operations described above, after STA1 115-a performs an early switch and moves the wireless communications from AP1 105-a to BS 120 to continue to provide an appropriate level of user experience on STA1 115-a, STA1 115-a may then monitor one or more network devices (e.g., AP1 105-a, AP2 105-b) to move the wireless communications back to a Wi-Fi network as early as possible and avoid the higher operational costs of having to access a network (e.g., Internet) using cellular network connectivity. STA1 115-a may also filter results from the monitoring (e.g., filtering scan reports) based at least in part on one or more threshold values stored in STA1 115-a. In another aspect, STA1 115-a may identify, based on the filtered results, one of the one or more network devices (e.g., APs 105) being monitored as suitable for the wireless communications. For example, STA1 115-a may identify the original or initial Wi-Fi access point (e.g., AP1 105-a) or another Wi-Fi access point (e.g., AP2 105-b) as suitable to handle the wireless communications. When a suitable AP 105 is identified, STA1 115-a may switch the wireless communications from BS 120 back to AP1 105-a or to AP2 105-b. When multiple APs 105 are suitable, STA1 115-a may be configured to select or identify the one that has the better link characteristics (e.g., highest data rates and/or highest PER). The framework operating on STA1 115-a may be configured to perform operations or provide instructions to cause the switching and, in some implementations, one or more of the monitoring, filtering, or identifying operations described herein and associated with STA1 115-a.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in WWANs, WLANs, personal area networks (PAN)s, or other suitable networks now known or later developed. Thus, the various aspects presented throughout this disclosure for handling data stall may be applicable to any suitable wireless network regardless of the coverage range and the wireless access protocols utilized.

It is to be understood that whereas various techniques described herein make reference to switching between Wi-Fi access points and cellular base stations in connection with data stall conditions, the same or similar techniques may apply when different RATs are used for the WLAN and/or WWAN deployments illustrated in FIG. 1. That is, whereas Wi-Fi technology may be a first RAT used in connection with the WLAN deployment in FIG. 1, other RATs may also be used as the first RAT and, similarly, whereas cellular (e.g., LTE) technology may be a second RAT used in connection with the WWAN deployment in FIG. 1, other RATs may also be used as the second RAT.

Figure 2A:
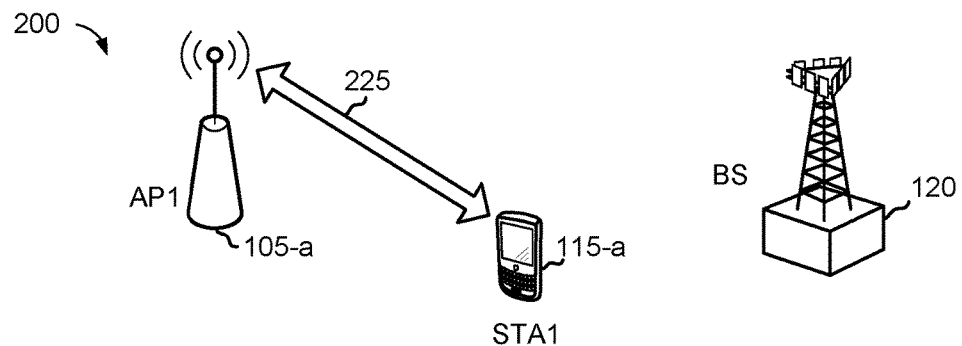
FIGS. 2A-2C are schematic diagrams illustrating switching between a WLAN and a WWAN for handling data stall conditions in accordance with various aspects of the present disclosure.

Referring to FIG. 2A, there is shown a diagram 200 illustrating wireless communications 225 taking place between STA1 115-a and AP1 105-a. Wireless communications 225 may occur over, for example, one or more communications links 125 as described above with respect to FIG. 1. In an aspect, wireless communications 225 may take place over a connection or channel established using communications links 125. Wireless communications 225 may correspond to the exchange of data and/or control information associated with one or more applications (e.g., user-level applications or end-user programs) operating on STA1

115-*a*. In an example of such applications, multimedia applications may operate on STA1 115-*a* to stream movies or other multimedia content from the Internet via AP1 105-*a*. In an aspect, the Internet may be accessed using network 118 as shown in FIG. 1.

In some instances, STA1 115-*a* may be close to the AP1 105-*a* and the quality of the link between the STA1 115-*a* and AP1 105-*a* may be good or sufficient to access a network for wireless communications 225 so that the user of STA1 115-*a* has a good experience. In other instances, STA1 115-*a* may move away from AP1 105-*a* but remain within the coverage area of AP1 105-*a* (e.g., coverage area 110-*a* in FIG. 1). For example, STA1 105-*a* may move closer to the edge of the coverage area of AP1 105-*a*. In such instances, the quality of the link between STA1 115-*a* and AP1 105-*a* may deteriorate as data rates decrease and/or PER increases, resulting or likely to result in data stall conditions. STA1 115-*a* may make an early determination to switch or move wireless communications 225 to BS 120 (see FIG. 2B) to continue to access the network (e.g., the Internet) in a manner that makes the experience acceptable to the user (e.g., without noticeable disruptions in the exchange of data). That is, STA1 115-*a* may switch connectivity from Wi-Fi network connectivity to cellular network connectivity in a seamless manner to the user. An early switch or move by STA1 115-*a* may refer to a transition that is determined and occurs prior to having a connection between STA1 115-*a* and AP1 105-*a* dropped because of poor link quality and/or congestion metrics. That is, STA1 115-*a* may determine, based on information such as uplink (UL) quality metrics, downlink (DL) quality metrics, and/or congestion metrics, to switch to a better connection using cellular network connectivity before a Wi-Fi network connection is dropped or lost.

Figure 2B:
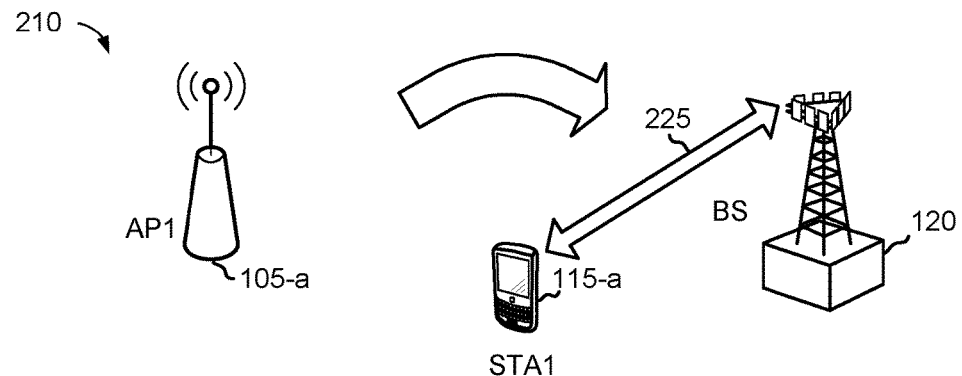

Referring to FIG. 2B, there is shown a diagram 210 illustrating an early switch of wireless communications 225 from AP1 105-*a* to BS 120. As noted above, conventional Wi-Fi modems may be generally configured to remain connected and associated with a Wi-Fi access point as much as possible if there are no other Wi-Fi access points for roaming. To overcome this issue and avoid data stall conditions, STA1 115-*a* may be configured to perform an early switch from Wi-Fi network connectivity (e.g., Wi-Fi network services) to cellular network connectivity (e.g., cellular network services) as described above. In an aspect, STA1 115-*a* may include a modem such as a Wi-Fi modem (e.g., modem 410 in FIG. 4) configured to switch the wireless communications 225 from AP1 105-*a* to BS 120 as illustrated in FIG. 2B. The modem may be configured to take into account, when determining whether to switch away from Wi-Fi network connectivity to cellular network connectivity, one or more of UL quality metrics, DL quality metrics, and/or congestion metrics. Congestion, or network congestion, may refer to the subset or fraction of airtime during which STA1 115-*a* is granted use of the Wi-Fi medium (e.g., for DL and UL communications) relative to other wireless stations (e.g., STA2 115-*b*) that are also connected to the AP1 105-*a*. Information about UL quality metrics, DL quality metrics, and/or congestion metrics may be identified, obtained, and/or determined by STA1 115-*a* based on information received from AP1 105-*a* and/or from measurements performed by STA1 115-*a*.

In another aspect, STA1 115-*a* may include a Wi-Fi modem and a cellular modem, or a single modem having both a Wi-Fi portion and a cellular portion (see e.g., modem 410 in FIG. 4 having a WLAN or Wi-Fi portion 417 and a WWAN or cellular portion 418). STA1 115-*a* may then switch wireless communications 225 as shown in FIG. 2B by having the cellular modem handle wireless communications 225 instead of the Wi-Fi modem, or by having the cellular portion of the single modem handle wireless communications 225 instead of the Wi-Fi portion of the single modem.

In an aspect, STA1 115-*a* may compare one or more of UL quality metrics, DL quality metrics, and/or congestion metrics to respective threshold values (e.g., thresholds 493 in FIGS. 5A and 5B) to determine whether to perform an early switch in order to handle data stall or similar conditions. For example, a set of metrics, including at least one UL quality metric, at least one DL quality metric, and/or at least one congestion metric may be evaluated by comparing each of these metrics to a respective threshold value (e.g., thresholds 493). Which metrics are included in the set of metrics may be dynamically determined or adjusted by a framework such as framework 460 or framework 610. Moreover, the set of metrics used for AP1 105-*a* may be different from a set of metrics used for another AP 105. In response to determining that the respective threshold values are not satisfied, STA1 115-*a* may disconnect from AP1 105-*a* and switch wireless communications 225 from AP1 105-*a* to BS 120 as shown in FIG. 2B. In other words, when the respective threshold value are not satisfied and AP1 is identified as not suitable for handling wireless communications 225, a switch from AP1 105-*a* to BS 120 (i.e., from Wi-Fi network connectivity to cellular network connectivity) may be triggered at STA1 115-*a*. In an aspect, a metric or a set of metrics not satisfying respective threshold values may refer to the metric or set of metrics not meeting a certain level of performance that would otherwise be considered sufficient for that metric or set of metrics. On the other hand, a metric or a set of metrics satisfying respective threshold values may refer to the metric or set of metrics meeting or exceeding a certain level of performance that would be considered sufficient for that metric or set of metrics.

In another aspect, in response to determining that the respective threshold values are not satisfied, STA1 115-*a* may determine to maintain a connection with AP1 105-*a* (see connection 325 in FIG. 3A) while also switching wireless communications 225 from AP1 105-*a* to BS 120. In this aspect, STA1 115-*a* may be configured to perform two separate determinations. For example, STA1 115-*a* may use a set of metrics and respective threshold values to determine to switch wireless communications 225 from AP1 105-*a* to BS 120. STA1 115-*a* may use the same set of metrics with different respective thresholds values, or a different set of metrics with respective threshold values, to determine whether to maintain a connection with AP1 105-*a*. That is, STA1 115-*a* may determine that the quality of the link with AP1 105-*a* does not provide the desired user experience and may switch wireless communications 225 to the BS 120, however, the quality of the link with AP1 105-*a* may be sufficient to easily track the performance of AP1 105-*a* so that STA1 115-*a* may quickly switch back to AP1 105-*a* to avoid the higher operational costs associated with BS 120 and also avoid scanning operations that may delay the return to Wi-Fi connectivity. In other words, wireless communications 225 may be switched to BS 120 when the metrics used in making that determination do not satisfy certain performance criteria, whereas a connection with AP1 105-*a* may be maintained when metrics used in making that determination satisfy certain performance criteria.

In an aspect, the values of the metrics in the set or sets of metrics and their respective threshold values may be based on information stored in Wi-Fi drivers/firmware (e.g., UL metrics 490, DL metrics 491, congestion metrics 492, and/or historic information (info) 494). In the example shown in FIG. 2B, a determination is made that a connection to AP1 105-a is not to be maintained and, consequently, STA1 115-a disconnects from AP1 105-a as part of switching wireless communications 225 to BS 120.

In another aspect, the threshold values used by STA1 115-a may be determined based on a desired user experience and user preference. For example, when a user wants to have a good experience streaming video content, STA1 115-a may monitor one or more UL quality metrics and/or one or more DL quality metrics that enable the appropriate application rate (e.g., 5 Mbps). This information may be used by STA1 115-a, along with the current contention/congestion information (e.g., congestion metrics), to identify a corresponding modulation and coding scheme (MCS) that needs to be supported to provide the desired user experience. In such instances, if the MCS that is identified cannot be maintained (e.g., the link quality is not sufficient or suitable for wireless communications 225), then STA1 115-a may determine to switch wireless communications 225 to BS 120.

The DL quality metrics being monitored or considered by STA1 115-a may include, for example, at least one or more of an MCS used by an AP 105 (e.g., AP1 105-a) in downlink transmissions, a PER experienced in connection with downlink transmissions, a number of retransmissions from an AP (e.g., captured lost Block Acknowledgements (BAs)) based on retransmitted sequence number, a received signal strength indication (RSSI) from a beacon sent by an AP, an RSSI for downlink data transmissions, a beacon loss rate, a loss of control frames (e.g., request-to-sent/clear-to-send (RTS/CTS) not followed by data can be representative of lost CTS), or similar metrics.

The UL quality metrics being monitored or considered by STA1 115-a may include, for example, at least one or more of an MCS used by STA1 115-a for uplink transmissions, a PER experienced in connection with uplink transmissions, a number of transmissions for which BAs are not properly received (e.g., number of consecutive BAs failures), a loss of control frames (e.g., RTS for which CTS is not received, BA request (BAR) for which BA is not received), a packet drop rate (e.g., a number of aggregated MAC protocol data units (AMPDUs) dropped), or similar metrics.

The congestion metrics being monitored or considered by STA1 115-a may include, for example, at least one or more of a channel access latency measured by STA1 115-a, an indication that the medium is busy (e.g., clear channel assessment (CCA) is high), a number of neighboring access points (e.g., whether a large number is present), a duration of transmissions from other STAs 115 (e.g., long duration, short interframe space (SIFS) bursting), or similar metrics.

Figure 5A:
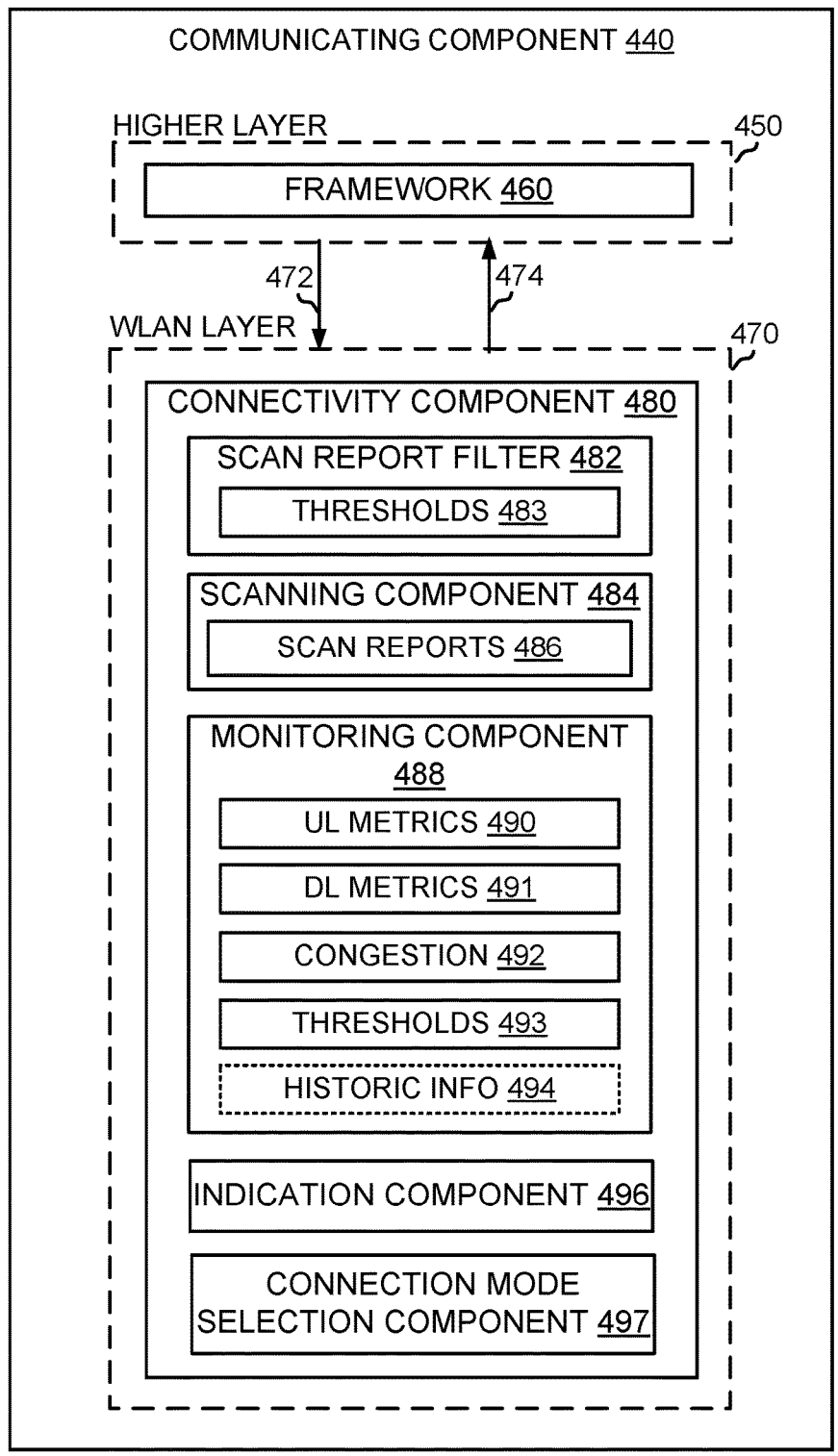
FIGS. 5A and 5B are block diagrams illustrating details of a communicating component in a wireless station for handling data stall conditions in accordance with various aspects of the present disclosure.
Figure 5B:
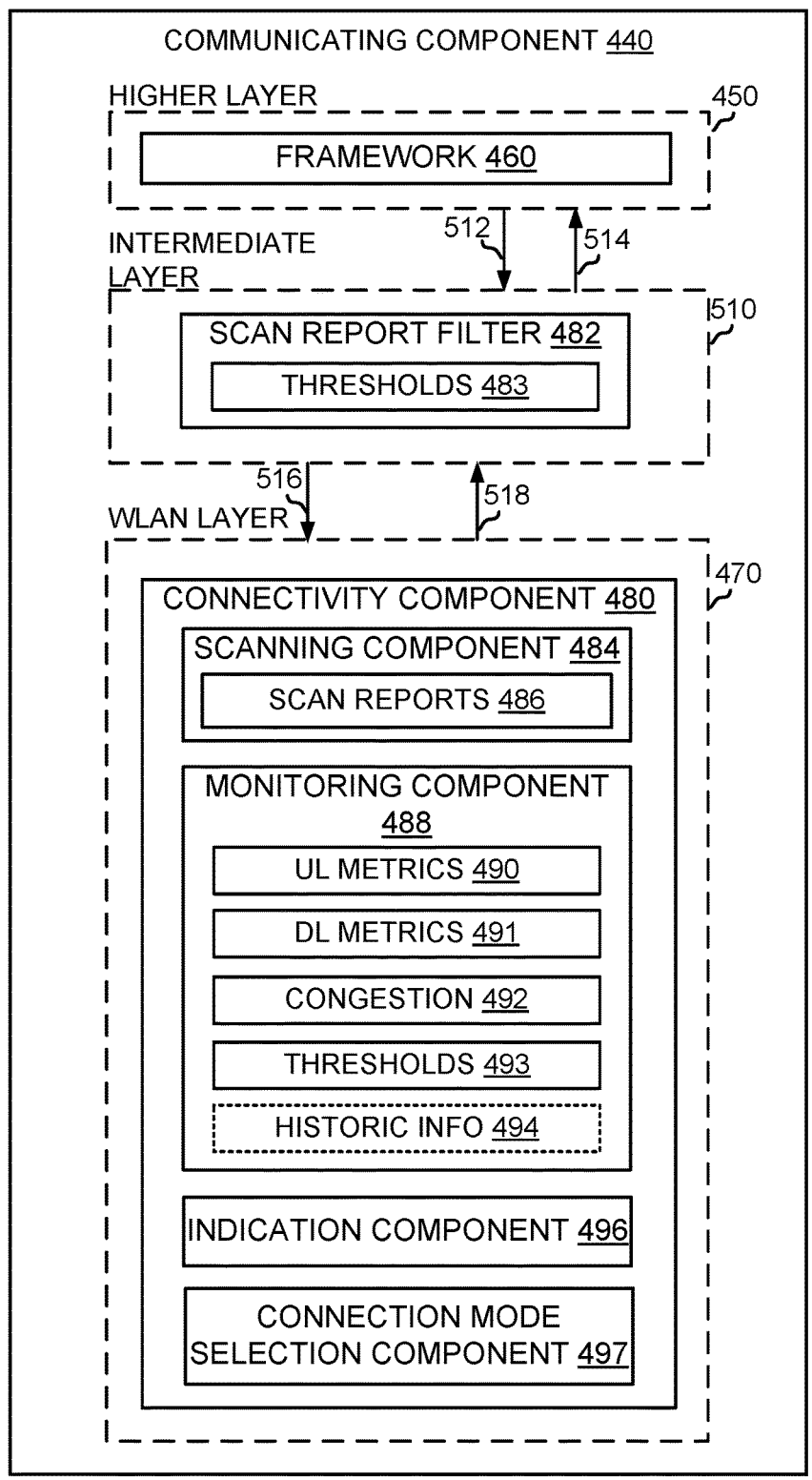
Figure 6:
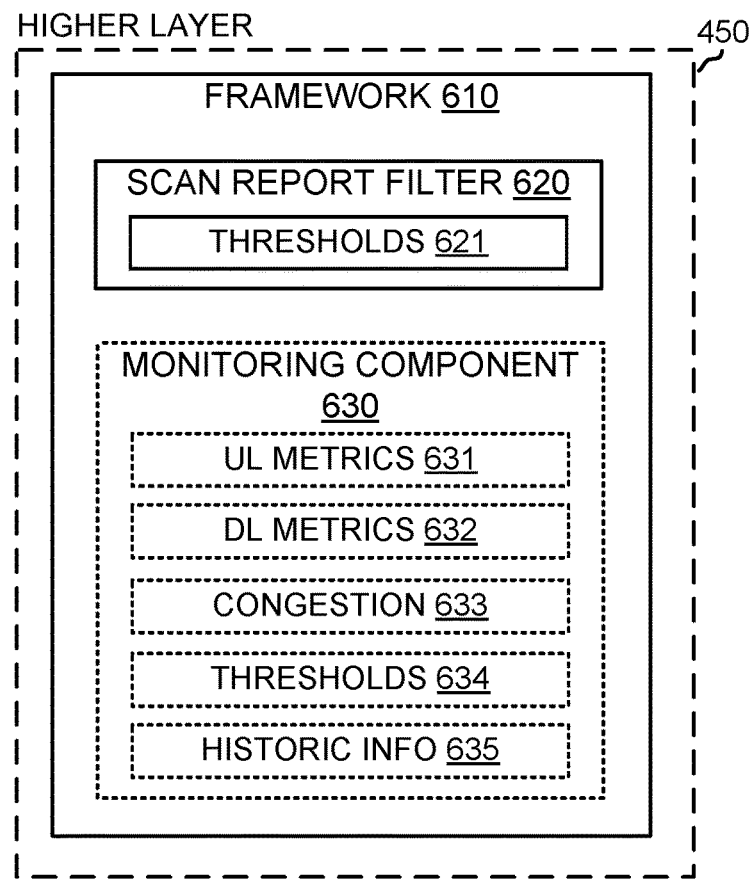
FIG. 6 is a block diagrams illustrating details of another example of a framework for handling data stall conditions in accordance with various aspects of the present disclosure.

In another aspect of an early switch of wireless communications 225 from AP1 105-a to BS 120, one or more of the threshold values (e.g., thresholds 483 and 493 in FIG. 5A, thresholds 621 and 634 in FIG. 6) can be changed or modified dynamically by a framework in a higher layer of STA1 115-a (e.g., framework 460 in FIGS. 4, 5A, and 5B, or framework 610 in FIG. 6). The threshold values can be changed or modified based on contextual information (e.g., applications running, service set identifier (SSID)). For example, one or more of the threshold values can be changed or modified dynamically by a framework based at least in part on which user-level application is being executed on STA1 115-a. In another example, when connecting to public hotspots, STA1 115-a may use more aggressive threshold values (e.g., the quality of the Wi-Fi link needs to be higher).

In such an example, a threshold value may be changed such that better link quality metrics are needed otherwise STA1 115-a may initiate an early switch of away from Wi-Fi network connectivity to cellular network connectivity. The framework may also reset one or more threshold values to a default value in response to changes in the contextual information. For example, when moving away from the public hotspot and accessing a different Wi-Fi access point, the framework may revert back to less aggressive threshold values and may change or modify the threshold values to default values.

An example of an UL quality metric may be metrics associated with UL data transmission at MCS0 (or lowest MCS). In such an example, when PER is considered, a threshold value of 50% (e.g., PER>50%) may be used. In such an example, when the number of consecutive transmission failures is considered, a threshold value of 10 (e.g., greater than 10) consecutive transmission failures may be used.

An example of a DL quality metric may be metrics associated with DL transmissions from an AP at MCS0 and based on sequence number. In such an example, when PER is considered, a threshold value of 50% (e.g., PER>50%) may be used. In such an example, when the number of retransmissions from the AP is considered, a threshold value of 10 (e.g., greater than 10) retransmission from the AP may be used.

An example of congestion metric may be a UL channel access latency. In such an example, a threshold value of 200 ms (e.g., latency>200 ms) may be used.

These examples of UL quality metrics, DL quality metrics, and congestion metrics are provided by way of illustration and not of limitation. Not only can different metrics be considered together, but the combination of metrics being considered may change dynamically during operation. Moreover, different threshold values may be also used (e.g., different default thresholds, threshold dynamically adjusted during operation).

In yet another aspect of an early switch of wireless communications 225 from AP1 105-a to BS 120, causing STA1 115-a to disassociate (e.g., disconnect) from AP1 105-a enables the framework operating on STA1 115-a (e.g., framework 460 in FIGS. 4, 5A, and 5B, framework 610 in FIG. 6) to automatically switch the wireless communications 225 to BS 120. For example, an indication that the conditions for disconnecting have been met may be provided to the framework to perform and/or instruct switching wireless communications 225 to BS 120. This may be one approach on how to cause the framework to switch wireless communications 225 from AP1 105-a to BS 120. In this approach, after STA1 115-a disconnects from AP1 105-a, the framework may provide instructions to perform scans or searches to identify one or more available APs 105 for switching back wireless communications 225 to Wi-Fi network connectivity. The scans or searches may identify AP1 105-a as one of the available APs 105-a.

As described above, and as shown in FIG. 3A, an alternative approach may be to continue to associate (e.g., connect) with the AP1 105-a, but still provide an indication to higher layers (e.g., a framework, a proprietary engine) that can then cause STA1 115-a to use BS 120 for wireless communications 225. By continuing the association with AP1 105-a, it may be easier for STA1 115-a to identify appropriate conditions to switch wireless communications 225 back to AP1 105-a. In this approach, STA1 115-a may not need to perform a scan or search and may simply wait until the conditions are appropriate to switch wireless communications 225 back to AP1 105-*a*. Moreover, STA1 115-*a* may continue to monitor one or more metrics associated with the connection (e.g., connection 325) to AP1 105-*a* after the switch, and may determine at some later time to disconnect from AP1 105-*a* in response to determining that the one or more metrics being monitored do not meet or satisfy respective threshold values for continuing to maintain the connection. In such a scenario, an indication may be provided to a framework, which in turn may provide instructions to perform scans or searches to identify one or more available APs 105 for switching back wireless communications 225 to Wi-Fi network connectivity.

Figure 2C:
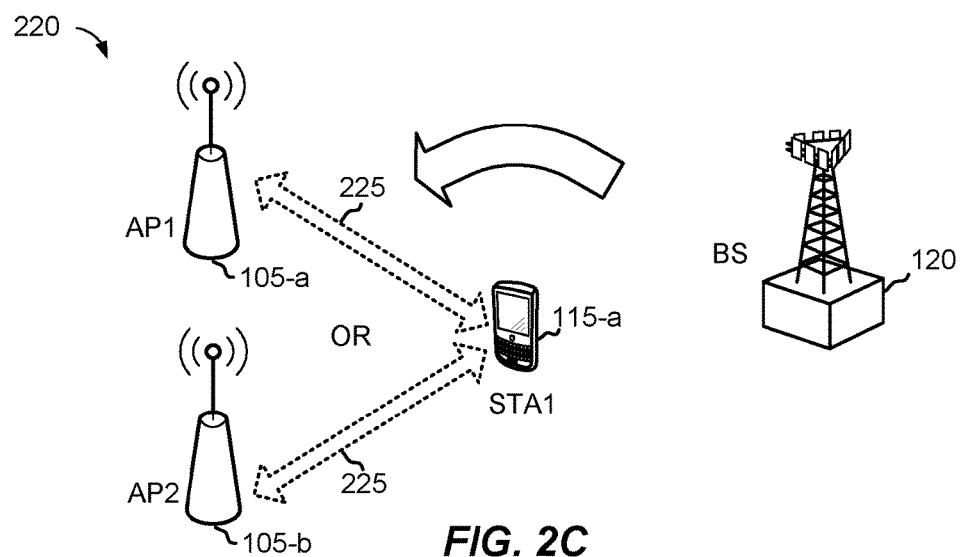

Referring to FIG. 2C, there is shown a diagram 220 illustrating a switch of wireless communications 225 from BS 120 back to AP1 115-*a* or to AP2 115-*b*. Once STA1 115-*a* switches wireless communications 225 to BS 120, there needs to be a mechanism to switch wireless communications 225 back to Wi-Fi network connectivity to take advantage of the lower operational cost associated with Wi-Fi services. One issue to consider is that after STA1 115-*a* has disassociated (e.g., disconnected) from AP1 105-*a*, a conventional framework operating on STA1 115-*a* may initiate scan or search operations to identify an available AP 105. Typically, such a framework, sometimes referred to as a basic framework, after detecting the beacon signal of an AP, may trigger or initiate an automatic association with that AP. In many cases, the beacon signal that would be detected as part of the scan or search operation is that of the AP from which STA1 115-*a* just disassociated, which in this example is AP1 105-*a*. However, AP1 105-*a* is not likely to have had its link quality improved by the time is identified or detected as part of the scan operation.

Thus, to prevent oscillating between AP1 105-*a* (e.g., Wi-Fi network connectivity) and BS 120 (e.g., cellular network connectivity), STA1 115-*a* is configured to prevent re-associating with the same AP 105 if the link quality of that AP 105 remains poor.

One approach that may be followed by STA1 115-*a* is to monitor the RSSI of beacons received from various APs 105, including the AP 105 from which STA1 115-*a* disassociated (e.g., AP1 105-*a*). If the beacon RSSI has not improved since the last disassociation (e.g., the beacon RSSI has not improved to satisfy a threshold value or has not improved by a set amount), then STA1 115-*a* will not associate with that AP 105. STA1 115-*a* may consider associating with another AP 105 that would provide an appropriate level of performance.

Another approach is to actively send transmissions to APs 105 (e.g., AP1 105-*a* and AP2 105-*b*) to determine or identify one or more link quality metrics. For example, quality-of-service (QoS) null frames can be used by STA1 115-*a* to measure uplink quality. In another aspect, the APs 105 may send downlink transmissions that may be used by STA1 115-*a* to measure downlink activity. In one example, STA1 115-*a* may send one or more requests, pings, or other similar messages to which the APs 105 respond and STA1 115-*a* may use the response to measure or otherwise determine downlink activity.

STA1 115-*a* may compare one or more of the UL quality metrics, DL quality metrics, and/or congestion metrics to respective thresholds values (e.g., thresholds 493 in FIGS. 5A and 5B, thresholds 634 in FIG. 6) to determine whether to switch back to Wi-Fi network connectivity from BS 120. In response to determining that the respective threshold values are satisfied, STA1 115-*a* may disconnect from BS 120 and switch wireless communications 225 from BS 120 back to AP1 105-*a* or optionally to AP2 105-*b* as shown in FIG. 2C. In an aspect, the results from comparing metrics to respective threshold values to determine whether to switch back to Wi-Fi network connectivity may be reported to a framework as part of a scan or search operation. In this regard, STA1 115-*a* may be configured to identify in the scan report, and based on the results from the comparison results, which of AP1 105-*a* and AP2 105-*b* is available and suitable for handling wireless communications 225. In an example, STA1 105-*a* may modify a scan report to remove an AP that is not suitable or to identify (e.g., label, tag) an AP that is not suitable.

In another aspect, scan or search operations may indicate or list available APs 105 and thresholds (e.g., thresholds 483, 493, 621, and 634) may be used to remove or identify those APs 105 that are not suitable for handling wireless communications 225.

The subset of UL quality metrics, DL quality metrics, and/or congestion metrics considered when determining whether to switch back to Wi-Fi network connectivity may be the same or different from the subset of UL quality metrics, DL quality metrics, and/or congestion metrics considered when determining whether to switch away from Wi-Fi network connectivity and to cellular network connectivity in the first place. Similarly, the respective threshold values considered when determining whether to switch back to Wi-Fi network connectivity may be the same or different from the respective threshold values considered when determining whether to switch away from Wi-Fi network connectivity and to cellular network connectivity in the first place.

In those instances in which STA1 115-*a* continues to remain associated (e.g., connected) to AP1 105-*a* (see e.g., FIG. 3A) and the framework operating on STA1 115-*a* switches wireless communications 225 from AP1 105-*a* to BS 120, STA1 115-*a* may continue to monitor one or more of the UL quality metrics or DL quality metrics (e.g., beacon RSSI, send active transmissions) of AP1 105-*a* and may notify or indicate to the framework to switch from cellular network connectivity back to Wi-Fi network connectivity when it is determined that the link quality of AP1 105-*a* has improved. In another aspect, STA1 115-*a* may monitor or measure one or more congestion metrics to determine network congestion information and use this information, along with the UL quality metrics and DL quality metrics, to determine whether to switch back to AP1 105-*a* for Wi-Fi network connectivity.

Figure 3A:
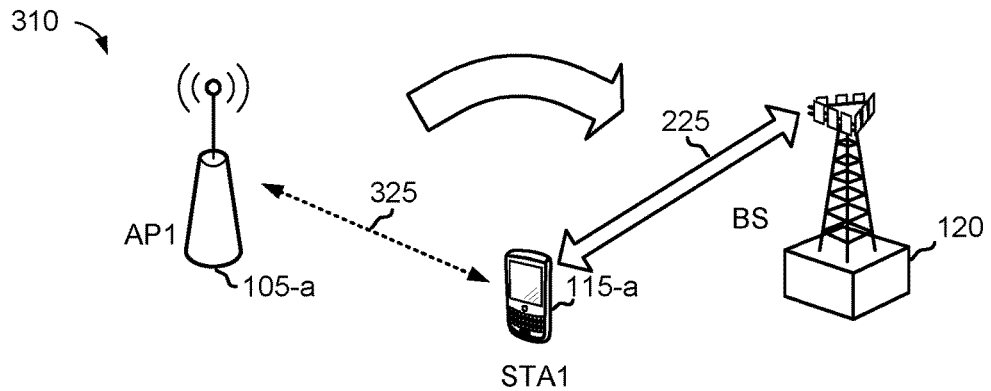
FIGS. 3A and 3B are schematic diagrams illustrating additional features of switching between a WLAN and a WWAN for handling data stall conditions in accordance with various aspects of the present disclosure.

Referring to FIG. 3A, there is shown a diagram 310 illustrating an early switch of wireless communications 225 from AP1 105-*a* to BS 120 while maintaining a connection 325 with AP1 105-*a*. As described above, even after switching wireless communications 225 to BS 120 to provide or maintain a certain level of user experience, there may be some instances in which STA1 115-*a* maintains a connection with AP1 105-*a*. By maintaining connection 325 with AP1 105-*a*, STA1 115-*a* may more easily monitor AP1 105-*a* to determine whether it can again handle wireless communications 225. For example, by having connection 325, STA1 115-*a* may not need to perform or schedule AP scans or searches. Connection 325 may be maintained when the quality of the link supporting the connection is sufficient for STA1 115-*a* to receive certain messages (e.g., beacon RSSI is strong enough) from AP1 105-*a* and/or perform certain data exchanges (e.g., send active transmissions, receive responses) with AP1 105-*a*. In this regard, STA1 115-*a* may use one or more metrics and their respective threshold values to determine whether the quality of the link would be good enough to maintain connection 325. When the quality of the link would not be sufficient, STA1 115-*a* may disconnect from AP1 105-*a*. When the disconnect occurs after switching wireless communications 225 to BS 120, then STA1 115-*a* may need to perform scan or search operations to identify available and suitable APs as described above.

Figure 3B:
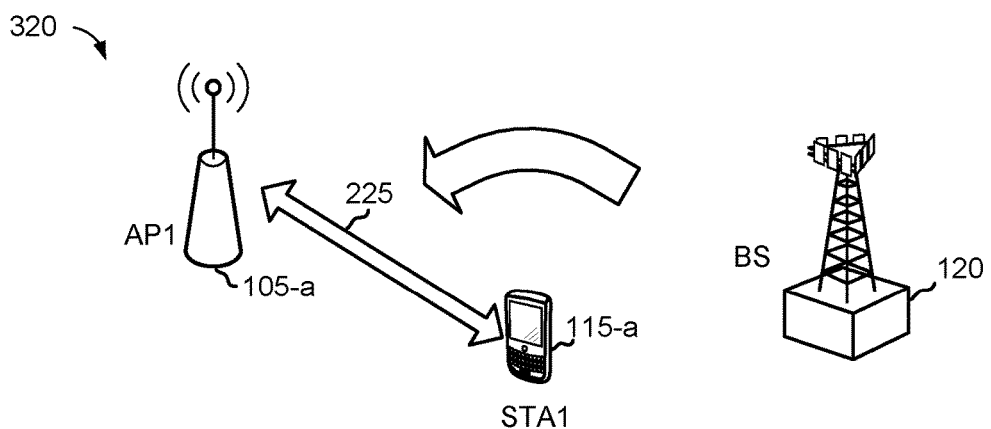

FIG. 3B shows a diagram 320 illustrating a switch back to Wi-Fi network connectivity as described above with respect to FIG. 2C. In this case, connection 325 exists with AP1 105-*a* and wireless communications 225 are switched back to AP1 105-*a* when STA1 115-*a* determines that the quality of the link to AP1 105-*a* is appropriate or adequate to provide the Wi-Fi network connectivity. As described above, STA1 115-*a* may monitor one or more UL quality metrics, DL quality metrics, or congestion metrics associated with AP1 105-*a* to determine whether to switch back to Wi-Fi network connectivity using AP1 105-*a*.

Referring to FIG. 4, in an aspect, a wireless communications system 400 is shown that represents at least a portion of wireless communications system 100 in FIG. 1. Wireless communications system 400 includes STA1 115-*a*, BS 120, AP1 105-*a*, and AP2 105-*b*. Also illustrated is network 118, which may be communicatively coupled to BS 120, AP1 105-*a*, and AP2 105-*b* through other network devices, including, in some cases, core network 130 in FIG. 1.

In an aspect, when STA1 115-*a* communicates with BS 120, it may do so by transmitting uplink signals 411 and/or receiving downlink signals 412. Similarly, when STA1 115-*a* communicates with AP1 105-*a*, it may do so by transmitting uplink signals 413 and/or receiving downlink signals 414. Moreover, when STA1 115-*a* communicates with AP2 105-*b*, it may do so by transmitting uplink signals 415 and/or receiving downlink signals 416.

As described above with respect to FIGS. 1-3B, STA1 115-*a* may be configured to perform an early switch from Wi-Fi network connectivity to cellular network connectivity, and to intelligently switch back to Wi-Fi network connectivity from cellular network connectivity. For example, STA1 115-*a* may carry out wireless communications 225 with AP1 105-*a* using uplink signals 413 and/or downlink signals 414. Once STA1 115-*a* determines that the quality of the connection with AP1 105-*a* has deteriorated, STA1 115-*a* may switch wireless communications 225 to BS 120 and may carry out wireless communications 225 with BS 120 using uplink signals 411 and/or downlink signals 412. Moreover, once STA1 115-*a* determines that the Wi-Fi network connectivity available from AP1 105-*a* or from AP2 105-*b* is of sufficient quality to provide an appropriate level of user experience, STA1 115-*a* may switch wireless communications 225 to AP1 105-*a* or AP2 105-*b*, whichever is appropriate. When switching to AP2 105-*b*, wireless communications 225 may be carried out using uplink signals 415 and/or downlink signals 416.

In accordance with the present disclosure, STA1 115-*a* may include a memory 425, one or more processors 430 and a transceiver 406. Memory 425, one or more processors 430, and transceiver 406 may communicate internally via a bus 135. In some examples, memory 425 and one or more processors 430 may be part of the same hardware component (e.g., may be part of a same board, module, or integrated circuit). Alternatively, memory 425 and one or more processors 430 may be separate components that may act in conjunction with one another. In some aspects, bus 135 may be a communication system that transfers data between multiple components and subcomponents of STA1 115-*a*. In some examples, one or more processors 430 may include any one or combination of modem processor, baseband processor, digital signal processor, and/or transmit processor. Additionally or alternatively, one or more processors 430 may include a communicating component 440 for carrying out one or more methods or procedures described herein. Communicating component 440 may comprise hardware, firmware, and/or software and may be configured to execute code or perform instructions stored in a memory (e.g., a computer-readable storage medium). In an aspect, one or more processors 430 may include a modem 410, which may be configured to perform Wi-Fi and/or cellular operations. In one example, as shown in FIG. 4, modem 410 may include a WLAN portion 417 configured to handle Wi-Fi modem operations and a WWAN portion 418 configured to handle cellular modem operations. In another example (not shown), one or more processors 430 may include separate modems for WLAN (e.g., Wi-Fi network) operations and WWAN (e.g., cellular network) operations. In an aspect, communicating component 440 may be implemented or included as part of modem 410.

In some examples, memory 425 may be configured for storing data used herein and/or local versions of applications or communicating component 440 and/or one or more of its subcomponents being executed by one or more processors 430. Memory 425 can include any type of computer-readable medium usable by a computer or a processor 430, such as random access memory (RAM), read only memory (ROM), tapes, magnetic discs, optical discs, volatile memory, non-volatile memory, and any combination thereof. In an aspect, for example, memory 425 may be a computer-readable storage medium (e.g., a non-transitory medium) that stores computer-executable code. The computer-executable code may define one or more operations or functions of communicating component 440 and/or one or more of its subcomponents, and/or data associated therewith. The computer-executable code may define these one or more operations or functions when STA1 115-*a* is operating processor 430 to execute communicating component 440 and/or one or more of its subcomponents to handle data stall and similar conditions.

In some examples, transceiver 406 may include a transmitter 434 for transmitting one or more data and control signals to AP1 105-*a*, AP2 105-*b*, or BS 120 via antenna(s) 402. Transceiver 406 may also include a receiver 432 for receiving one or more data and control signals from AP1 105-*a*, AP2 105-*b*, or BS 120 via antenna(s) 402. Transceiver 406 may comprise hardware, firmware, and/or software and may be configured to execute code or perform instructions stored in a memory (e.g., a computer-readable storage medium). Transceiver 406 may be configured to perform one or more of the switching operations described herein. For example, when a determination is made to switch wireless communications from Wi-Fi network connectivity to cellular network connectivity or from cellular network connectivity to Wi-Fi network connectivity, transceiver 406 may be configured accordingly. Similarly, radio frequency (RF) front end 404 in STA1 115-*a* may be configured according to the switching being performed. For example, one or more of switches 462, 463, and 466, filter(s) 464, low-noise amplifier(s) (LNA(s)) 461, or power amplifier(s) (PA(s)) 465, may be configured according to whether Wi-Fi network connectivity (e.g., wireless communications with AP1 105-*a* or AP2 105-*b*) or cellular network connectivity (e.g., wireless communications with BS 120) is being used.

Communicating component 440 may include a framework 460 associated with a first layer 450 and a connectivity component 480 associated with a second layer 470, where the second layer 470 may be referred to as a WLAN layer. First layer 450 may be considered a higher and separate layer than second layer 470. A higher layer may refer to a layer that is operationally closer to or associated with an application (e.g., video streaming application) operating or executing on STA1 115-a. As described above, an application may refer to a user-level application or end-user program. Framework 460 may be configured to perform operations and/or provide instructions to switch the wireless communications (e.g., wireless communications 225) associated with an application from, for example, an AP 105 (e.g., AP1 105-a or AP2 105-b) to a base station (e.g., BS 120), and/or back from, for example, a base station to an AP 105.

In an aspect, framework 460 may be configured to receive an indication (e.g., a message) to change or switch wireless communications in response to conditions associated with a data stall. In an aspect, framework 460 may receive an indication from connectivity component 480 to change from WLAN connectivity (e.g., Wi-Fi network connectivity) to WWAN connectivity (e.g., cellular network connectivity) and/or back to WLAN connectivity from WWAN connectivity. For example, framework 460 may receive a first type of indication from connectivity component 480 to switch wireless communications 225 from AP1 105-a to BS 120. In another example, framework 460 may receive a second type of indication from connectivity component 480 to switch wireless communications 225 from BS 120 to AP1 105-a or to AP2 105-b. In this example, the second type of indication may identify to which AP 105 is wireless communications 225 to be switched.

In another aspect, the first type of indication may be provided by connectivity component 480 in response to a determination by connectivity component 480 that one or more metrics associated with a link, channel, or connection with AP1 105-a do not meet or satisfy respective threshold values. Accordingly, the first type of indication is provided so that the appropriate actions are taken to ensure that a certain user experience level is provided for an existing application operating on STA1 115-a.

In yet another aspect, the second type of indication may be provided by connectivity component 480 in response to a determination that one of AP1 105-a and AP2 105-b is available and suitable to handle the wireless connections for the existing application. In those instances in which a connection was maintained with AP1 105-a after switching to cellular network connectivity, the second type of indication may be part of a message reporting that metrics associated with AP1 105-a are such that AP1 105-a is now capable of handling the wireless communications for the existing application. In those instances in which a connection with AP1 105-a was not maintained after switching to cellular network connectivity, the second type of indication may be part of a scan report identifying which APs are available and suitable (e.g., meet or satisfy the appropriate threshold values). The scan report may be a modified or adjusted to identify which APs can be considered for a switch back to Wi-Fi network connectivity.

Connectivity component 480 may be configured to monitor aspects of Wi-Fi network connectivity, including monitoring different metrics. For example, connectivity component 480 may be configured to monitor one or more UL quality metrics, one or more DL quality metrics, and/or one or more congestion metrics as described above. Monitoring may refer to different operations that enable connectivity component 480 to determine a current value for the metrics. In an example, monitoring may include operations such as detecting messages or signals, measuring or identifying characteristics of such messages or signals (e.g., RSSI), identifying information in the messages or signals, and/or generating messages or signals for transmission to receive responses from which to obtain metric information. Moreover, monitoring may also include storing, collecting, retrieving, and/or obtaining historical information (e.g., historic info 494) associated with one or more of the UL quality metrics, DL quality metrics, and/or congestion metrics, to use such information when determining whether to switch network connectivity and/or whether to maintain a connection to the original or initial AP.

Connectivity component 480 may be configured to determine, based in part on the monitoring operations, when the conditions are met to switch wireless communications 225 from Wi-Fi network connectivity to cellular network connectivity to avoid data stall conditions and/or from cellular network connectivity to Wi-Fi network connectivity to reduce the operational cost of the services being used to provide network access. In an aspect, connectivity component 480 may generate an indication (e.g., a first type of indication as described above), which is communicated to framework 460, where the indication identifies conditions associated with a data stall such that framework 460 can determine to switch from Wi-Fi network connectivity to cellular network connectivity. In this regard, framework 460 may perform operations and/or provide instructions to carry out the switch. Similarly, connectivity component 480 may generate an indication (e.g., a second type of indication as described above), which is communicated to framework 460, where the indication identifies conditions suitable for switching back wireless communications to Wi-Fi network connectivity such that framework 460 can determine to switch from cellular network connectivity back to Wi-Fi network connectivity. In this regard, framework 460 may perform operations and/or provide instructions to carry out the switch back to Wi-Fi network connectivity. In a related aspect, the indication that identifies conditions suitable for switching back wireless communications to Wi-Fi network connectivity may be part of a scan report, where the scan report has been filtered by communicating component 440 (see e.g., scan report filter 482, scan report filter 620) to prevent a situation in which connectivity simply oscillates between Wi-Fi network connectivity and cellular network connectivity. For example, if the link quality of the original or initial AP has not improved (e.g., by comparing metrics to respective threshold values), such AP may be removed from a scan report, or identified as not suitable in the scan report, by the filtering operation described above. By doing so, it is possible to avoid going back to the original or initial AP and then quickly have to switch the wireless communications back to a base station (e.g., BS 120) because the Wi-Fi connection is again poor. In an aspect, the scan report, after being filtered or otherwise modified, may identify each of the APs 105 that satisfy the appropriate threshold values and are suitable for use in Wi-Fi network connectivity. Moreover, when more than one AP 105 is listed in the scan report as suitable for handing the wireless communications, the scan report may modified or adjusted to also provide an indication of which of the APs 105 may provide better performance. In addition, multiple scan reports may be generated and filtered as part of the filtering operations.

Connectivity component 480 may also be configured to determine when to maintain an active connection with AP1 105-a while also switching wireless communications 225 from AP1 105-a to BS 120 (see e.g., FIG. 3A). For example, connectivity component 480 may determine a mode (e.g., connected, not connected) to use with the original or initial AP 105 (e.g., AP1 105-a) based at least in part on whether certain monitored metrics (e.g., UL quality metrics, DL quality metrics, congestion metrics) meet or satisfy respective threshold values. In an aspect, for at least some of the metrics being monitored, the threshold values used for determining whether to maintain a connection may the same as the threshold values used for determining whether to switch wireless communications to a different type of network connectivity. In another aspect, for at least some of the metrics being monitored, the threshold values used for determining whether to maintain a connection may different from the threshold values used for determining whether to switch wireless communications to a different type of network connectivity.

FIG. 5A and FIG. 5B illustrate different implementation details of communicating component 440 described above with respect to FIG. 4. In FIG. 5A, communicating component 440 is shown having first layer 450 ("higher layer") with framework 460 and second layer 470 ("WLAN layer" or "Wi-Fi layer") with connectivity component 480. Information may be passed between first layer 450 and second layer 470 via one or more signals. For example, information (e.g., data, control) may be communicated from second layer 470 to first layer 450 via signals 474, whereas information may be communicated from first layer 450 to second layer 470 via signals 472. In one example, messages including indications or scan reports may be communicated to framework 460 via signals 474, whereas instructions for scan operations and/or updated threshold values may be communicated to connectivity component 480 via signals 472. As described above, each layer may have one or more interfaces (not shown) that allows the layer to communicate with another layer. In the example shown in FIG. 5A, first layer 450 may have an interface to communicate with one or more higher layers (e.g., application layers) as well as an interface to communicate with second layer 470. Similarly, second layer 470 may have an interface to communicate with first layer 450 as well as an interface to communicate with one or more lower layers. In an aspect, the one or more lower layers may be associated with Wi-Fi drivers and/or firmware. In another aspect, signals 472 and 474 are configured or use certain protocols to allow an interface in first layer 450 to communicate with an interface in second layer 470.

Connectivity component 480 may include a scan report filter 482, a scanning component 484, a monitoring component 488, an indication component 496, and a connection mode selection component 497. Monitoring component 488 may be configured to monitor (e.g., track, measure, estimate, and/or identify) a value for one or more metrics associated with wireless connectivity. For example, monitoring component 488 may be configured to monitor Wi-Fi network connectivity metrics such as UL (quality) metrics 490, DL (quality) metrics 491, and congestion metrics 492. In an aspect, monitoring component 488 may utilize information associated with signals received from one or more network devices (e.g., downlink signals 412 from BS 120, downlink signals 414 from AP1 105-a, downlink signals 416 from AP2 105-b) to determine one or more of the metrics described above. Moreover, monitoring component 488 may generate requests or similar messages to be sent to network devices (e.g., BS 120, AP1 105-a, AP2 105-b) to obtain information (e.g., response messages) from which to monitor one or more metrics as described above. In one example, signals including requests or similar messages may be sent to network devices (e.g., uplink signals 411 to BS 120, uplink signals 413 to AP1 105-a, uplink signals 415 to AP2 105-b) to request a response from which to track, measure, estimate, and/or identify values or other characteristics for one or more metrics.

Monitoring component 488 may perform comparisons between one or more metrics and respective threshold values (e.g., thresholds 493) to determine whether the threshold values are met or satisfied. In an aspect, the one or more metrics may be based on historic information (e.g., historic info 494), which may be determined, maintained, stored, and/or received by monitoring component 488. That is, previously obtained and/or determined metric values may be used along with recently obtained and/or determined metric values when making comparisons to the threshold values. For example, for beacon RSSI of a particular Wi-Fi access point, monitoring component 488 may average multiple readings over a period of time to obtain an average beacon RSSI, which can then be compared to a respective threshold value to determine whether the respective threshold value is met or satisfied. Other approaches (e.g., mean, minimum, maximum) may be used in which the historic info 494 is used to produce a metric value to be compared to a respective threshold value.

In an aspect, monitoring component 488 may compare one or more metrics to respective threshold values to determine whether to switch connectivity from Wi-Fi network connectivity to cellular network connectivity or to switch connectivity from cellular network connectivity to Wi-Fi network connectivity. In such instances, monitoring component 488 may compare one or more metrics for at least one AP 105 (e.g., AP1 105-a or AP2 105-b) to identify any AP for which the one or more metrics satisfy the respective threshold values. Based on results from operations performed by monitoring component 488, indication component 496 may provide a message or indication to framework 460 via signals 474 to perform operations or provide instructions for the appropriate switch of the wireless communications. In an aspect, framework 460 may configure hardware and/or software operations of modem 410, RF transceiver 406, and/or RF front end 404 to perform the appropriate switch of wireless communications between Wi-Fi network connectivity and cellular connectivity.

In an aspect, when a connection to AP1 105-a is not maintained while a switch is made to cellular network connectivity from Wi-Fi network connectivity, operations performed by monitoring component 488 on one or more APs 105 may be in connection with scanning operations performed by scanning component 484 and/or instructed by framework 460.

Monitoring component 488 may also be configured to compare one or more metrics to respective threshold values (e.g., thresholds 493) to determine whether to maintain a connection with an original or initial Wi-Fi access point (see e.g., FIG. 3A). The respective threshold value of a metric used in determining whether to maintain a connection may be the same or different from the respective threshold value for that metric when used to determine whether to switch connectivity. In this regard, thresholds 493 may include a first subset of threshold values for switching connectivity and a second subset of threshold values for maintaining the connection to the original or initial AP 105.

Connection mode selection component 497 may be configured to identify or determine, based on the monitoring, whether a connection with the original or initial AP 105 is to be maintained. Connection mode selection component 497 may signal or provide some indication to indication component 496 of the need to maintain the connection (e.g., connection 325), and indication component 496 in turn may provide an indication to framework 460 via signals 474 that the connection is being maintained. In an aspect, framework 460 may perform operations or provide instructions to maintain the connection to the original or initial AP 105 even when the wireless communications are switched away from that AP. In another aspect, maintaining the connection to the original or initial AP may be handled by connectivity component 480 and/or connection mode selection component 497. Connection mode selection component 497 may be part of monitoring component 488. In such a case, it is monitoring component 488 that may signal or provide some indication to indication component 496 of the need to maintain the connection (e.g., connection 325).

After framework 460 performs operations or provides instructions for switching wireless communications 225 from Wi-Fi network connectivity (e.g., AP1 105-a) to cellular network connectivity (e.g., BS 120) to overcome data stall conditions, framework 460 may instruct connectivity component 480 (e.g., via messages in signals 472) to perform scanning operations to identify an AP 105 with a suitable link quality to switch wireless communications 225 back to Wi-Fi network connectivity to avoid the higher operational costs associated with cellular network connectivity. Scanning component 484 may be configured to receive instructions from framework 460 and manage the appropriate scanning operations. In an aspect, scanning component 484 may operate with monitoring component 488 to track, measure, estimate, and/or identify one or more metrics for one or more Wi-Fi access points. The information collected from the scanning operations may be organized or formatted into scan reports 486, which in turn may be provided to scan report filter 482.

Scan report filter 482 may be configured to adjust, modify, or change information in scan reports 486. For example, scan report filter 482 may be configured to use thresholds 483. Scan report filter 482 may be configured to retrieve, receive, or otherwise obtain the threshold values in thresholds 483 from, for example, framework 460. Scan report filter 482 may then compare one or more metrics of different APs 105 in a scan report or in multiple scan reports with respective threshold values. When the metrics for a particular AP 105 do not meet or satisfy the threshold values, that particular Wi-Fi access point may be identified as not suitable for handling the wireless communications and may be removed from the scan report or identified (e.g., tagged, labeled) in the scan report as not being suitable. In this manner, communicating component 440 has an established mechanism to avoid oscillating between Wi-Fi network connectivity and cellular network connectivity when the link quality of the original or initial AP has not improved. That is, the original or initial AP is removed from consideration by framework 460 unless the performance of such AP has been shown to have improved. The modified or adjusted scan reports that are produced by scan report filter 482 may be provided to framework 460 to enable framework 460 make determinations of whether to switch the wireless communications (e.g., wireless communications 225). The modified or adjusted scan reports may be provided to framework 460 via one or more signals 474.

As noted above, framework 460 may be configured to dynamically change or modify one or more threshold values based on, for example, contextual information (e.g., applications running, service set identifier (SSID)). As such, framework 460 may be configured to modify one or more threshold values in thresholds 483 and/or in thresholds 493. In an aspect, the threshold values in thresholds 483 may be different from the threshold values for the same metric in thresholds 493.

Referring to FIG. 5B, communicating component 440 is shown having first layer 450 ("higher layer") with framework 460, second layer 470 ("WLAN layer" or "Wi-Fi layer") with connectivity component 480, and a third layer 510 ("Intermediate layer") with scan report filter 482. In this example, scan report filter 482 is now operated or executed in third layer 510 and separate from connectivity component 480 as shown in FIG. 5A. Information is passed between first layer 450, second layer 470, and third layer 510 via one or more signals. For example, information may be communicated from second layer 470 to third layer 510 via signals 518, whereas information may be communicated from third layer 510 to second layer 470 via signals 516. Similarly, information may be communicated from first layer 450 to third layer 510 via signals 512, whereas information may be communicated from third layer 510 to first layer 450 via signals 514. As described above, each layer may have an interface (not shown) that allows it to communicate with another layer. In the example shown in FIG. 5B, first layer 450 may have an interface to communicate with one or more higher layers (e.g., application layers) as well as an interface to communicate with third layer 510. Third layer 510 may have an interface to communicate with first layer 450, and may use the same or a different interface to communicate with second layer 470. Similarly, second layer 470 may have an interface to communicate with third layer 510 as well as an interface to communicate with one or more lower layers. In an aspect, signals 512 and 514 are configured or use certain protocols to allow interfaces in first layer 450 and third layer 510 to communicate with each other, whereas signals 516 and 518 are configured or use certain protocols to allow interfaces in third layer 510 and second layer 470 to communicate with each other.

FIG. 6 illustrates implementation details of a framework 610 as a smart or intelligent framework capable of performing operations and/or functions that are not typically carried out by standard framework implementations. In this example, framework 610 may operate in first layer 450 ("Higher layer") in the same manner as framework 460 in FIGS. 4, 5A, and 5B. Framework 610, however, may be configured to perform at least some of the features described above with respect to monitoring component 488 and scan report filter 482. In this case, framework 610 may optionally include a monitoring component 630 that may perform the same or similar functions as monitoring component 488 in FIGS. 5A and 5B. Framework 610 may also optionally include scan report filter 620 that may perform the same or similar functions as scan report filter 482 in FIGS. 5A and 5B. Although not shown, framework 610 may optionally perform the same or similar functions as indication component 496 and/or connection mode selection component 497 in FIGS. 5A and 5B. As shown in this example, monitoring component 630 may optionally include one or more of UL metrics 631, DL metrics 632, congestion metrics 633, thresholds 634, or historic info 635, where each of these elements or components may have the same or similar functionality as its corresponding element or component in monitoring component 488. Scan report filter 620 may optionally include thresholds 621, which may have the same or similar functionality as thresholds 483 in scan report filter 482. In some implementations, framework 610 may be configured to perform features associated with scan report filter 620, features associated with monitoring component 630, or features from both scan report filter 620 and monitoring component 630.

Figure 7:
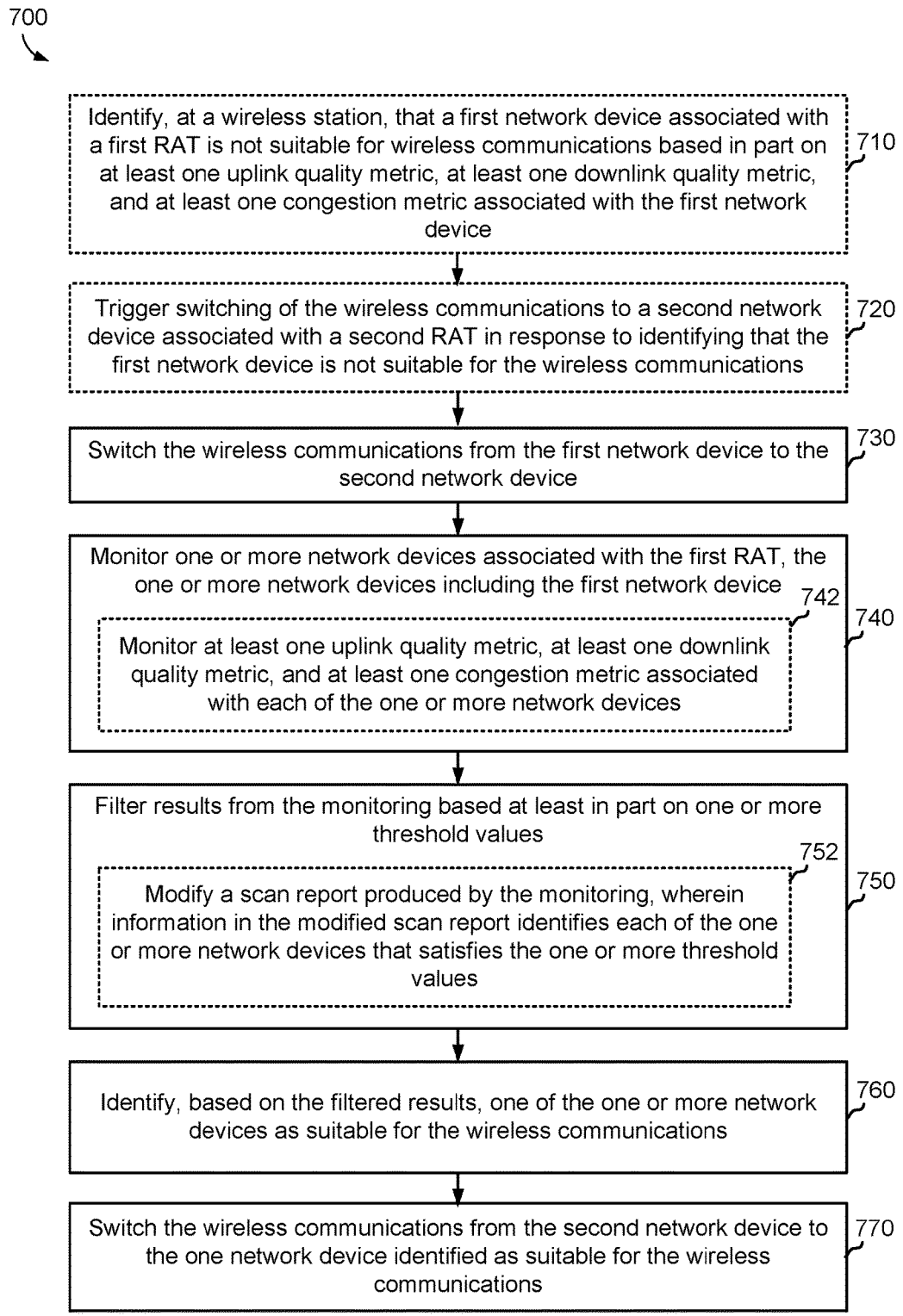
FIG. 7 is a flow diagram illustrating an example method of handling data stall conditions in accordance with various aspects of the present disclosure.

Referring to FIG. 7, examples of one or more operations of communicating component 440 (FIGS. 4, 5A, and 5B) according to the present apparatus, methods, and computer-readable medium are described with reference to one or more methods and one or more elements or components that may perform the actions of these methods. It is to be understood that communicating component 440 may be implemented using memory 425 and/or processor(s) 430, the latter of which may include modem 410. In an aspect, at least a portion of communicating component 440 may be implemented as part of modem 410. Although the operations described below are presented in a particular order and/or as being performed by an example element or component, it should be understood that the ordering of the actions and the elements or components performing the actions may be varied, depending on the implementation. Also, although communicating component 440 is illustrated as having a number of subcomponents, it should be understood that one or more of the illustrated subcomponents may be separate from, but in communication with, communicating component 440 and/or each other. It should be understood that the following actions or components described with respect to the communicating component 440 and/or its subcomponents may be performed by a specially-programmed processor, a processor executing specially-programmed software or computer-readable media, or by any other combination of a hardware component and/or a software component specially configured for performing the described actions or components. Moreover, each of the following actions or components may be implemented by a respective means, which has a corresponding hardware component as illustrated in connection with FIGS. 4, 5A, 5B, and 6.

In an aspect, at block 710, method 700 for handling data stall at a wireless station may optionally include identifying, at a wireless station, that a first network device associated with a first radio access technology (RAT) is not suitable for wireless communications based in part on at least one uplink quality metric, at least one downlink quality metric, and at least one congestion metric associated with the first network device. In one example, the wireless station may be STA1 115-*a*, the wireless communications may be wireless communications 225, the first network device may be AP1 105-*a*, and the first RAT may be a WLAN technology such as Wi-Fi technology. In such an example, processor(s) 430, modem 410, communicating component 440, connectivity component 480, and/or monitoring component 488 may be configured to determine or identify that the quality of the link between STA1 115-*a* and AP1 105-*a* is poor and not suitable to maintain the wireless communications 225. In an aspect, one or more of UL quality metrics (e.g., UL metrics 490), DL quality metrics (DL metrics 491), or congestion metrics (e.g., congestion 492) may be compared to respective threshold values (e.g., thresholds 493) to determine whether the threshold values are satisfied and the quality of the link between STA1 115-*a* and AP1 105-*a* is suitable to maintain the wireless communications 225. In a related aspect, each UL quality metric being compared may be compared to a respective threshold value in a first subset of the threshold values (e.g., a first subset of thresholds 493 associated with UL quality metrics), each DL quality metric being compared may be compared to a respective threshold value in a second subset of the threshold values (e.g., a second subset of thresholds 493 associated with DL quality metrics), and each congestion metric being compared may be compared to a respective threshold value in a third subset of the threshold values (e.g., a third subset of thresholds 493 associated with congestion metrics). The various metrics may be associated with Wi-Fi drivers and/or firmware in connection with processor(s) 430 and memory 425.

In another aspect, at block 720, method 700 may optionally include triggering the switching of the wireless communications to a second network device associated with a second RAT in response to identifying that the first network device is not suitable for the wireless communications. In one example, the second network device may be BS 120 and the second RAT may be a WWAN technology such a cellular technology (e.g., LTE). In such example, processor(s) 430, modem 410, communicating component 440, connectivity component 480, and/or monitoring component 488 may be configured to trigger, initiate, or otherwise indicate the need for switching of wireless communications 225 to BS 120. In an aspect, the triggering may include generating an indication by indication component 496 and providing the indication to a framework (e.g., framework 460) so that the appropriate functions and operations are performed or the appropriate instructions are provided to initiate and carry out the switch of wireless communications 225 to BS 120. In another aspect, the indication may be provided to the framework through one or more messages such as messages included in signals 474 (FIG. 5A) or signals 514 (FIG. 5B) to framework 460.

At block 730, method 700 may include switching the wireless communications from the first network device to the second network device. In one example, STA1 115-*a* may switch wireless communications 225 from AP1 105-*a* to BS 120. In such example, processor(s) 430, modem 410, communicating component 440, and/or framework 460 may be configured to switch wireless communications 225 from AP1 105-*a* to BS 120 as illustrated in FIGS. 2B and 3A. In some instances, STA1 115-*a* may remain connected to AP1 105-*a* even after the switch to cellular wireless connectivity with BS 120. In other instances, STA1 115-*a* may not remain connected to AP1 105-*a* after the switch to cellular wireless connectivity with BS 120.

At block 740, method 700 may monitor one or more network devices associated with the first RAT, where the one or more network devices include the first network device. In one example, STA1 115-*a* may monitor multiple APs 105, including AP1 105-*a* and AP2 105-*b* since STA1 115-*a* is within the coverage area of both of these APs (FIG. 1). In such an example, processor(s) 430, modem 410, communicating component 440, scanning component 484, and/or monitoring component 488 may be configured to monitor one or more APs 105 to determine when at least one of those APs 105 is suitable for handling the wireless communications 225. In an aspect, monitoring component 488 may be configured to perform one or more of detecting signals, identifying and processing information in one or more signals, performing measurements based on signals received, generating one or more types of massages to obtain information from APs, or comparing information (e.g., metrics) with threshold values. In some instances, monitoring component 488 may generate, store, retrieve, and/or analyze historic information (e.g., historic info 494), including historic metric information such as historic uplink/downlink quality metrics, as part of the monitoring operations being performed. The monitoring may include performing scan or search operations in connection with scanning component 484 to identify which of the APs 105 that are available to STA1 115-*a* is also suitable (or is best suited) for handling wireless communications 225.

In an aspect of block 740, method 700 at block 742 may optionally include monitoring at least one UL quality metric, at least one DL quality metric, and at least one congestion metric associated with each of the one or more network devices. In one example, processor(s) 430, modem 410, communicating component 440, scanning component 484, and/or monitoring component 488 may be configured to monitor metrics for one or more of the APs 105 being monitored.

At block 750, method 700 may include filtering results from the monitoring based at least in part on one or more threshold values. In one example, STA1 115-*a* may filter results from monitoring to remove APs 105 that do not meet certain criteria (e.g., do not meet or satisfy threshold values corresponding to certain quality metrics) for handling the wireless communications 225. In such an example, processor(s) 430, modem 410, communicating component 440, and/or scan report filter 482 may be configured to filter results from monitoring performed by monitoring component 488. In an aspect, scan report filter 482 may be in the same layer as communicating component 440 ("WLAN layer" or second layer 470) or in an intermediate layer ("Intermediate layer" or third layer 510). In an aspect, the filtering may include comparing at least one metric associated with the APs 105 being monitored or scanned with a respective threshold from thresholds 483, and identifying suitable, non-suitable, and/or most suitable APs 105 based on the results of the comparison.

In an aspect of block 750, method 700 at block 752 may optionally include modifying a scan report produced by the monitoring of the one or more network devices, wherein information in the modified scan report identifies each of the one or more network devices that satisfy the one or more threshold values. In one example, STA1 115-*a* may modify information or content in one or more scan reports 486 to identify which of the APs 105 listed in the scan report are suitable for handling wireless communications 225, which ones are not suitable for handling wireless communications 225, and/or which one is the most suitable or best suited for handling wireless communications 225. In such an example, the APs 105 that are not suitable may be removed from the scan report or may be identified (e.g., tagged, labeled) as being unsuitable or non-suitable. When a modified scan report is provided to framework 460, a determination of whether to switch wireless communications 225 and to which device may be based on the information included in the modified scan report. Moreover, in such an example, processor(s) 430, modem 410, communicating component 440, and/or scan report filter 482 may be configured to modify scan reports.

At block 760, method 700 may include identifying, based on the filtered results, one of the one or more network devices as suitable for the wireless communications. In one example, STA1 115-*a* may identify which of APs 105 is suitable to handle the wireless communications 225. In such an example, processor(s) 430, modem 410, and/or framework 460 may be configured to identify a suitable AP 105 from the modified scan reports provided by scan report filter 482.

At block 770, method 700 may include switching the wireless communications from the second network device to the one network device identified as suitable for the wireless communications. In one example, STA1 115-*a* may switch wireless communications 225 from BS 120 to one of the APs 105 that has been found to be suitable for handling wireless communications 225. As shown in FIG. 2C, STA1 115-*a* may switch wireless communications 225 back to AP1 105-*a* or optionally to AP2 105-*b*, depending on which one is capable of handling the wireless communications 225 such that the data stall condition is averted or avoided. In this example, processor(s) 430, modem 410, and/or framework 460 may be configured to switch wireless communications 225 back to Wi-Fi network connectivity either through AP1 105-*a* or AP2 105-*b* to return to a lower operational cost service while also providing the level of user experience desired for an existing application.

Although the operations described above with respect to FIG. 7 have been described at least partially in connection with framework 460, it is to be understood that the various operations may also be performed in connection with framework 610 in FIG. 6 and that framework 610 may also perform some or all of the functions described in connection with scan report filter 482 and monitoring component 488. For example, framework 610 may be configured to perform the switching operations described in connection with blocks 730 and 770, as well as the monitoring, filtering, and identifying operations described in connection with blocks 740 (and 742), 750 (and 752), and 760, respectively.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for handling data stall at a wireless station, comprising:
    determining, at the wireless station, to switch wireless communications from a first network device associated with a first radio access technology (RAT) to a second network device associated with a second RAT;
    switching, by the wireless station, the wireless communications from the first network device to the second network device;
    monitoring one or more network devices associated with the first RAT, the one or more network devices including the first network device, wherein the monitoring includes monitoring for at least one of the one or more network devices, at least one uplink quality metric, at least one downlink quality metric, or at least one congestion metric;
    filtering results from the monitoring based at least in part on one or more threshold values, wherein the filtering includes identifying which of the one or more network devices is not suitable for the wireless communications;
    identifying based on the filtered results, one of the suitable network devices that remain in the filtered results for the wireless communications; and
    switching, by the wireless station, the wireless communications from the second network device to the one suitable network device identified for the wireless communications.

2. The method of claim 1, wherein:
    filtering results from the monitoring occurs at a layer different from one having a framework operated on the wireless station and configured to provide switching instructions, the layer being a first RAT layer or an intermediate layer between the framework and the first RAT layer.

3. The method of claim 2, further comprising dynamically modifying, through the framework, at least one of the one or more threshold values based in part on which user-level application is being executed on the wireless station.

4. The method of claim 1, wherein filtering results from the monitoring includes modifying a scan report produced by the monitoring of the one or more network devices, and wherein information in the modified scan report identifies each of the one or more network devices that satisfies the one or more threshold values as suitable for the wireless communications.

5. The method of claim 1, further comprising:
    identifying that the first network device is not suitable for the wireless communications based in part on the at least one uplink quality metric, the at least one downlink quality metric, or the at least one congestion metric associated with the first network device; and
    triggering the switching of the wireless communications to the second network device in response to identifying that the first network device is not suitable for the wireless communications.

6. The method of claim 5, wherein:
    the at least one uplink quality metric includes one or more of:
        a modulation coding scheme (MCS) for uplink transmissions,
        a packet error rate (PER) experienced in connection with uplink transmissions,
        a number of transmissions for which block acknowledgments (BAs) are not properly received, or
        a loss of control frames, or a packet drop rate,
    the at least one downlink quality metric includes one or more of:
        an MCS used in downlink transmissions,
        a PER experienced in connection with downlink transmission,
        a number of retransmissions based on retransmitted sequence number,
        a received signal strength indication (RSSI) from a beacon,
        an RSSI for downlink data transmissions,
        a beacon loss rate, or
        or a loss of control frames, and
    the at least one congestion metric includes one or more of:
        a channel access latency measured by the wireless station,
        an indication that a communication medium is busy,
        a number of neighboring access points, or
        a duration of transmissions from other wireless stations.

7. The method of claim 1, wherein the first RAT is a wireless local area network (WLAN) technology and the second RAT is a wireless wide area network (WWAN) technology.

8. The method of claim 1, wherein the first RAT has lower associated operational costs for the wireless station than the second RAT.

9. The method of claim 1, further comprising:
    determining that a connection between the wireless station and the first network device is not to be maintained, and switching the wireless communications to the second network device at least in part in response to the determination that the connection is not to be maintained.

10. The method of claim 1, wherein filtering results from the monitoring includes identifying which of the one or more network devices to remove from a scan report and which to identify as not suitable for the wireless communications in the scan report based at least in part on historical information associated with one or more of the at least one uplink quality metric, the at least one downlink quality metric, or the at least one congestion metric.

11. An apparatus for handling data stall, comprising:
a memory configured to store instructions; and
one or more processors communicatively coupled to the memory, the one or more processors configured to execute the instructions to:
determine, at a wireless station, to switch wireless communications from a first network device associated with a first radio access technology (RAT) to a second network device associated with a second RAT;
switch, by the wireless station, the wireless communications from the first network device to the second network device;
monitor one or more network devices associated with the first RAT, the one or more network devices including the first network device, wherein to monitor the one or more network devices, the one or more processors are further configured to monitor for at least one of the one or more network devices, at least one uplink quality metric, at least one downlink quality metric, or at least one congestion metric;
filter results from the monitoring based at least in part on one or more threshold values, wherein to filter the results, the one or more processors are further configured to identify which of the one or more network devices is not suitable for the wireless communications;
identify, based on the filtered results, one of the suitable network devices that remain in the filtered results for the wireless communications; and
switch, by the wireless station, the wireless communications from the second network device to the one suitable network device identified for the wireless communications.

12. The apparatus of claim 11, wherein:
the one or more processors are configured to filter the results from the monitoring at a layer different from one having a framework operated on the wireless station and configured to provide switching instructions, the layer being a first RAT layer or an intermediate layer between the framework and the first RAT layer.

13. The apparatus of claim 12, wherein the one or more processors are further configured to dynamically modify, through the framework, at least one of the one or more threshold values based in part on which user-level application is being executed on the apparatus.

14. The apparatus of claim 11, wherein to filter results from the monitoring, the one or more processors are configured to modify a scan report produced by the monitoring of the one or more network devices, wherein information in the modified scan report identifies each of the one or more network devices that satisfies the one or more threshold values as suitable for the wireless communications.

15. The apparatus of claim 11, wherein the one or more processors are further configured to:

identify that the first network device is not suitable for the wireless communications based in part on the at least one uplink quality metric, the at least one downlink quality metric, or the at least one congestion metric associated with the first network device; and
trigger the switching of the wireless communications to the second network device in response to identifying that the first network device is not suitable for the wireless communications.

16. The apparatus of claim 15, wherein:
the at least one uplink quality metric includes one or more of:
a modulation coding scheme (MCS) for uplink transmissions,
a packet error rate (PER) experienced in connection with uplink transmissions,
a number of transmissions for which block acknowledgments (BAs) are not properly received, or
a loss of control frames, or a packet drop rate,
the at least one downlink quality metric includes one or more of:
an MCS used in downlink transmissions,
a PER experienced in connection with downlink transmission,
a number of retransmissions based on retransmitted sequence number,
a received signal strength indication (RSSI) from a beacon,
an RSSI for downlink data transmissions,
a beacon loss rate, or
or a loss of control frames, and
the at least one congestion metric includes one or more of:
a channel access latency measured by the wireless station,
an indication that a communication medium is busy,
a number of neighboring access points, or
a duration of transmissions from other wireless stations.

17. The apparatus of claim 11, wherein the first RAT is a wireless local area network (WLAN) technology and the second RAT is a wireless wide area network (WWAN) technology.

18. The apparatus of claim 11, wherein the first RAT has lower associated operational costs for the apparatus than the second RAT.

19. The apparatus of claim 11, wherein the one or more processors are further configured to determine that a connection between the apparatus and the first network device is not to be maintained, and switching the wireless communications to the second network device at least in part in response to the determination that the connection is not to be maintained.

20. The apparatus of claim 11, wherein to filter results from the monitoring, the one or more processors are further configured to identify which of the one or more network devices to remove from a scan report and which to identify as not suitable for the wireless communications in the scan report based at least in part on historical information associated with one or more of the at least one uplink quality metric, the at least one downlink quality metric, or the at least one congestion metric.

21. An apparatus for handling data stall, comprising:
means for determining, at a wireless station, to switch wireless communications from a first network device associated with a first radio access technology (RAT) to a second network device associated with a second RAT;

means for switching, by the wireless station, the wireless communications from the first network device to the second network device;

means for monitoring one or more network devices associated with the first RAT, the one or more network devices including the first network device, wherein the means for monitoring includes means for monitoring for at least one of the one or more network devices, at least one uplink quality metric, at least one downlink quality metric, or at least one congestion metric;

means for filtering results from the monitoring based at least in part on one or more threshold values, wherein the means for filtering includes means for identifying which of the one or more network devices is not suitable for the wireless communications; and means for identifying, based on the filtered results, one of the suitable network devices that remain in the filtered results for the wireless communications, wherein the means for switching is further for switching, by the wireless station, the wireless communications from the second network device to the one suitable network device identified for the wireless communications.

22. The apparatus of claim 21, wherein:

filtering results from the monitoring occurs at a layer different from one having a framework operated on the wireless station and configured to provide switching instructions, the layer being a first RAT layer or an intermediate layer between the framework and the first RAT layer.

23. The apparatus of claim 21, wherein the means for filtering results from the monitoring includes means for modifying a scan report produced by the monitoring of the one or more network devices, wherein information in the modified scan report identifies each of the one or more network devices that satisfies the one or more threshold values as suitable for the wireless communications.

24. The apparatus of claim 21, further comprising:

means for identifying that the first network device is not suitable for the wireless communications based in part on the at least one uplink quality metric, the at least one downlink quality metric, or the at least one congestion metric associated with the first network device; and means for triggering the switching of the wireless communications to the second network device in response to identifying that the first network device is not suitable for the wireless communications.

25. The apparatus of claim 21, wherein the first RAT is a wireless local area network (WLAN) technology and the second RAT is a wireless wide area network (WWAN) technology.

26. The apparatus of claim 21, further comprising means for determining that a connection between the apparatus and the first network device is not to be maintained, and switching the wireless communications to the second network device at least in part in response to the determination that the connection is not to be maintained.

27. The apparatus of claim 21, wherein the means for filtering results from the monitoring includes means for identifying which of the one or more network devices to remove from a scan report and which to identify as not suitable for the wireless communications in the scan report based at least in part on historical information associated with one or more of the at least one uplink quality metric, the at least one downlink quality metric, or the at least one congestion metric.

28. A non-transitory computer-readable medium storing code executable by a computer for handling data stall at a wireless station, comprising:

code stored in the computer-readable medium for determining, at the wireless station, to switch wireless communications from a first network device associated with a first radio access technology (RAT) to a second network device associated with a second RAT;

code stored in the computer-readable medium for switching, by the wireless station, the wireless communications from the first network device to the second network device;

code stored in the computer-readable medium for monitoring one or more network devices associated with the first RAT, the one or more network devices including the first network device, wherein the code for monitoring includes code for monitoring for at least one of the one or more network devices, at least one uplink quality metric, at least one downlink quality metric, or at least one congestion metric;

code stored in the computer-readable medium for filtering results from the monitoring based at least in part on one or more threshold values, wherein the code for filtering includes code for identifying which of the one or more network devices is not suitable for the wireless communications;

code stored in the computer-readable medium for identifying, based on the filtered results, one of the suitable network devices that remain in the filtered results for the wireless communications; and code stored in the computer-readable medium for switching, by the wireless station, the wireless communications from the second network device to the one suitable network device identified for the wireless communications.

* * * * *